United States Patent
Madhwaraj et al.

(10) Patent No.: US 7,532,574 B1
(45) Date of Patent: May 12, 2009

(54) METHOD AND APPARATUS FOR IMPROVED PRIORITY BASED CONNECTION ESTABLISHMENT WITHIN A PNNI ATM NETWORK

(75) Inventors: Ashwin Madhwaraj, San Jose, CA (US); Sandeep Dhar, Milpitas, CA (US); Puneet Gupta, Sunnyvale, CA (US); Mana Palai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 786 days.

(21) Appl. No.: 10/678,897

(22) Filed: Oct. 2, 2003

(51) Int. Cl.
*G01R 31/08* (2006.01)

(52) U.S. Cl. .................. 370/231; 370/232; 370/236; 370/252; 370/355; 370/395.21; 709/235; 709/240

(58) Field of Classification Search .................. 370/225, 370/236, 227, 351; 709/238, 239; 340/2.1, 340/2, 23, 825.01
See application file for complete search history.

(56) References Cited

U.S. PATENT DOCUMENTS

| | | | |
|---|---|---|---|
| 4,703,475 A | 10/1987 | Dretzka et al. |
| 4,845,710 A | 7/1989 | Nakamura et al. |
| 4,953,157 A | 8/1990 | Franklin et al. |
| 5,121,383 A | 6/1992 | Golestani |
| 5,128,932 A | 7/1992 | Li |
| 5,140,584 A | 8/1992 | Suzuki |
| 5,153,877 A | 10/1992 | Esaki et al. |
| 5,193,090 A | 3/1993 | Filipiak et al. |
| 5,197,064 A | 3/1993 | Chao |
| 5,208,805 A | 5/1993 | Ochiai |
| 5,222,085 A | 6/1993 | Newman |
| 5,224,099 A | 6/1993 | Corbalis et al. |
| 5,233,606 A | 8/1993 | Pashan et al. |
| 5,274,643 A | 12/1993 | Fisk |
| 5,276,681 A | 1/1994 | Tobagi et al. |
| 5,313,454 A | 5/1994 | Bustini et al. |
| 5,335,224 A | 8/1994 | Cole et al. |
| 5,341,366 A | 8/1994 | Soumiya et al. |
| 5,359,592 A | 10/1994 | Corbalis et al. |
| 5,359,593 A | 10/1994 | Derby et al. |
| 5,361,259 A | 11/1994 | Hunt et al. |
| 5,361,372 A | 11/1994 | Rege et al. |

(Continued)

OTHER PUBLICATIONS

Olieveira, et al New Preemption Policies for DiffServ-Aware Traffic Engineering to Minimize Rerouting Proceeding of IEEE INFOCOM 2002, N.Y., N.Y. Jun. 23-27,2002.*

(Continued)

*Primary Examiner*—Seema S Rao
*Assistant Examiner*—Henry Baron
(74) *Attorney, Agent, or Firm*—Blakely, Sokoloff, Taylor & Zafman LLP

(57) ABSTRACT

A method to assist in deciding whether or not an ATM PNNI network link is able to sustain a new connection is described. The method comprises, if the link is not within an LCN exhaustion state and the new connection requests more bandwidth than is advertised as being available upon the link for the new connection's service category, regarding the bandwidth available for the new connection as a sum. The sum comprises addition of: 1) the advertised available bandwidth and 2) the total bandwidth reserved on the link for connections having lower priority than the new connection enhanced by over-subscription for the service category.

42 Claims, 13 Drawing Sheets

U.S. PATENT DOCUMENTS

| | | | |
|---|---|---|---|
| 5,367,643 A | 11/1994 | Chang et al. |
| 5,381,404 A | 1/1995 | Sugano et al. |
| 5,390,299 A | 2/1995 | Rege et al. |
| 5,420,857 A | 5/1995 | Jurkevich |
| 5,422,880 A | 6/1995 | Heitkamp et al. |
| 5,425,019 A | 6/1995 | Chugo et al. |
| 5,483,526 A | 1/1996 | Ben-Nun et al. |
| 5,528,763 A | 6/1996 | Serpanos |
| 5,539,729 A | 7/1996 | Bodnar |
| 5,546,389 A | 8/1996 | Wippenbeck et al. |
| 5,561,663 A | 10/1996 | Klausmeier |
| 5,602,988 A | 2/1997 | Haulin |
| 5,613,073 A | 3/1997 | Hammond, Jr. et al. |
| 5,617,417 A | 4/1997 | Sathe et al. |
| 5,687,167 A | 11/1997 | Bertin et al. |
| 5,729,546 A | 3/1998 | Gupta et al. |
| 5,748,905 A | 5/1998 | Hauser et al. |
| 5,754,787 A | 5/1998 | Dedrick |
| 5,764,626 A | 6/1998 | VanDervort |
| 5,781,533 A | 7/1998 | Manning et al. |
| 5,790,770 A | 8/1998 | McClure et al. |
| 5,793,744 A | 8/1998 | Kanerva et al. |
| 5,815,492 A | 9/1998 | Berthaud et al. |
| 5,822,540 A | 10/1998 | Caldara et al. |
| 5,850,395 A | 12/1998 | Hauser et al. |
| 5,862,137 A | 1/1999 | Manning et al. |
| 5,867,663 A | 2/1999 | McClure et al. |
| 5,870,538 A | 2/1999 | Manning et al. |
| 5,872,769 A | 2/1999 | Caldara et al. |
| 5,872,771 A | 2/1999 | Park et al. |
| 5,881,049 A | 3/1999 | Beshai et al. |
| 5,889,956 A | 3/1999 | Hauser et al. |
| 5,896,511 A | 4/1999 | Manning et al. |
| 5,898,671 A | 4/1999 | Hunt et al. |
| 5,898,691 A | 4/1999 | Liu |
| 5,905,729 A | 5/1999 | Gaddis et al. |
| 5,909,427 A | 6/1999 | Manning et al. |
| 5,917,804 A | 6/1999 | Shah et al. |
| 5,917,805 A | 6/1999 | Manning et al. |
| 5,926,475 A | 7/1999 | Saldinger et al. |
| 5,933,429 A | 8/1999 | Bubenik et al. |
| 5,936,940 A | 8/1999 | Marin et al. |
| 5,940,372 A | 8/1999 | Bertin et al. |
| 5,948,067 A | 9/1999 | Caldara et al. |
| 5,956,342 A | 9/1999 | Manning et al. |
| 5,970,067 A | 10/1999 | Sathe et al. |
| 5,978,359 A | 11/1999 | Caldara et al. |
| 5,982,771 A | 11/1999 | Caldara et al. |
| 5,982,776 A | 11/1999 | Manning et al. |
| 5,983,260 A | 11/1999 | Hauser et al. |
| 5,983,278 A | 11/1999 | Chong et al. |
| 5,991,298 A | 11/1999 | Hunt et al. |
| 5,996,019 A | 11/1999 | Hauser et al. |
| 6,002,667 A | 12/1999 | Manning et al. |
| 6,011,778 A | 1/2000 | Kilkki et al. |
| 6,028,840 A | 2/2000 | Worster |
| 6,041,039 A | 3/2000 | Kikki et al. |
| 6,052,385 A | 4/2000 | Kanerva et al. |
| 6,061,348 A | 5/2000 | Castrigno et al. |
| 6,076,112 A | 6/2000 | Hauser et al. |
| 6,084,858 A | 7/2000 | Matthews et al. |
| 6,088,736 A | 7/2000 | Manning et al. |
| 6,088,817 A | 7/2000 | Haulin |
| 6,115,374 A | 9/2000 | Stonbridge et al. |
| 6,115,748 A | 9/2000 | Hauser et al. |
| 6,141,346 A | 10/2000 | Caldara et al. |
| 6,160,808 A | 12/2000 | Maurya |
| 6,167,030 A | 12/2000 | Kikki et al. |
| 6,167,452 A | 12/2000 | Manning et al. |
| 6,181,705 B1 | 1/2001 | Branstad et al. |
| 6,212,582 B1 | 4/2001 | Chong et al. |
| 6,219,728 B1 | 4/2001 | Yin |
| 6,222,824 B1 | 4/2001 | Marin et al. |
| 6,236,655 B1 | 5/2001 | Caldara et al. |
| 6,256,309 B1 | 7/2001 | Daley et al. |
| 6,256,674 B1 | 7/2001 | Manning et al. |
| 6,327,615 B1 | 12/2001 | Kasper |
| 6,356,546 B1 | 3/2002 | Beshai |
| 6,356,962 B1 | 3/2002 | Kasper |
| 6,407,998 B1 | 6/2002 | Polit et al. |
| 6,418,169 B1 | 7/2002 | Datari |
| 6,426,957 B1 | 7/2002 | Hauser et al. |
| 6,466,582 B2 | 10/2002 | Venter et al. |
| 6,490,249 B1 | 12/2002 | Aboul-Magd et al. |
| 6,493,317 B1 | 12/2002 | Ma |
| 6,496,504 B1 | 12/2002 | Malik |
| 6,512,769 B1 | 1/2003 | Chui et al. |
| 6,516,371 B1 | 2/2003 | Lai et al. |
| 6,526,060 B1 | 2/2003 | Hughes et al. |
| 6,526,063 B1 * | 2/2003 | St-Amand et al. ........ 370/395.5 |
| 6,526,451 B2 | 2/2003 | Kasper |
| 6,539,024 B1 | 3/2003 | Janoska et al. |
| 6,546,249 B1 | 4/2003 | Imai et al. |
| 6,608,813 B1 | 8/2003 | Chiussi et al. |
| 6,608,815 B1 | 8/2003 | Huang et al. |
| 6,625,155 B1 | 9/2003 | Dziong |
| 6,658,014 B1 | 12/2003 | Tezuka |
| 6,678,264 B1 | 1/2004 | Gibson |
| 6,690,671 B1 | 2/2004 | Anbiah et al. |
| 6,724,881 B1 | 4/2004 | McAllister et al. |
| 6,731,599 B1 | 5/2004 | Hunter et al. |
| 6,747,972 B1 | 6/2004 | Lenoski et al. |
| 6,778,495 B1 | 8/2004 | Blair |
| 6,819,658 B1 | 11/2004 | Agarwal et al. |
| 6,826,196 B1 | 11/2004 | Lawrence |
| 6,862,284 B1 | 3/2005 | Spiegel et al. |
| 6,876,657 B1 | 4/2005 | Brewer et al. |
| 6,891,836 B1 | 5/2005 | Chen et al. |
| 6,895,441 B1 * | 5/2005 | Shabtay et al. .............. 709/238 |
| 6,934,249 B1 | 8/2005 | Bertin et al. |
| 6,977,898 B1 | 12/2005 | Miriyala |
| 7,039,014 B1 | 5/2006 | Krishnamurthy et al. |
| 7,233,571 B1 | 6/2007 | Krishnamurthy et al. |
| 7,480,239 B1 | 1/2009 | Sundaresan et al. |
| 2002/0018269 A1 | 2/2002 | Chaudhuri et al. |
| 2002/0057649 A1 | 5/2002 | Kinnunen |
| 2003/0236854 A1 * | 12/2003 | Rom et al. ................. 709/217 |
| 2005/0207371 A1 | 9/2005 | Chen et al. |

OTHER PUBLICATIONS

J.C. de Oliveira, et al., "A New Preemption Policy for DiffServ-Aware Traffic Engineering to Minimize Rerouting," Proceedings ot IEEE INFOCOM 2002, pp. 695-704 (Jun. 23-27, 2002).

"RADCOM Network Simulators and Analyzers," http://www.radcom.com/Products.aspx?boneId=660&pageCTemplate=0&print=2, 1 page (based on product prior to Dec. 18, 2001).

"RADCOM Protocol Simulators/PNNI Simulator," http://www.radcom.com/Products.aspx?boneId=936&PageCTemplate=0&print=2, 2 pgs. (based on product prior to Dec. 18, 2001).

"Soft-ATM Private Network-to-Network Interface (PNNI)," http://www.ikon-gmbh.de/german/datasheets/netplane/pnni.htm (Jul. 12, 2001).

"PNNI: A little background," http://www.antc.utwente.nl/Reports/ATM/PNNI/pnni_background.html (Sep. 19, 2001).

"Protocol Directory—ATM Signaling & Routing," http://www/protocols.com/pbook/atmsig.htm (Nov. 14, 2001).

International Telecommunication Union (ITU), ITU-T, Q.2931. B-ISDN Application Protocols for Access Signaling (Feb. 1995).

The ATM Forum Technical Committee, "Addressing Addendum to ATM User-Network Interface (UNI) Signalling Specification, Version 4.0," ATM Forum document No. AF-CS-0107.000, Feb. 1999.

The ATM Forum Technical Committee, "UNI Signalling 4.0 Security Addendum," ATM Forum document No. AF-CS-0117.000, May 1999.

The ATM Forum Technical Committee, "Modification of Traffic Parameters for an Active Connection Signalling Specification (PNNI, AINI, and UNI), Version 2.0," ATM Forum document No. AF-CS-0148.001, May 2001.

The ATM Forum Technical Committee, "ATM User-Network Interface (UNI) Signalling Specification, Version 4.0," ATM Forum document No. af-sig-0061.000, Jul. 1996.

Saltouros, Marios P., et al., "A Scalable Qos-Based Routing Scheme for ATM Networks Using Reinforcement Learning Algorithms," University of Athens, Greece (1999).

"Enhanced Frame Solutions Multilink Frame," White Paper, Lucent Technologies, Inc. (Jul. 2001).

"End-to-End Multilink Frame Replay Implementation Agreement," FRF.15, Frame Relay Forum Technical Committee (Aug. 1999).

"Multilink Frame Replay UNI/NNI Implementation Agreement," FRF. 16, Frame Relay Forum Technical Committee (Aug. 1999).

"Priority Queuing Strategies and Buffer Allocation Protocols for Traffic Control at an ATM Integrated Broadband Switching System", A. Lin et al., IEEE Journal on Selected Areas in Communications, vol. 9, No. 9, Dec. 1991, pp. 1524-1536.

"Comparative Performance Study of Space Priority Mechanisms for ATM Network", H. Kröner, Proceedings IEEE Infocom '90, The Conference on Computer Communications, Ninth Annual Joint Conference of the IEEE Computer and Communications Societies, Los Alamitos, CA, Jun. 3-7, 1990, pp. 1136-1143.

"Dimensioning of an ATM switch with shared buffer and threshold priority", J.F. Meyer, et al., Computer Networks and ISDN Systems, vol. 26, No. 1, 1993, pp. 95-108.

* cited by examiner

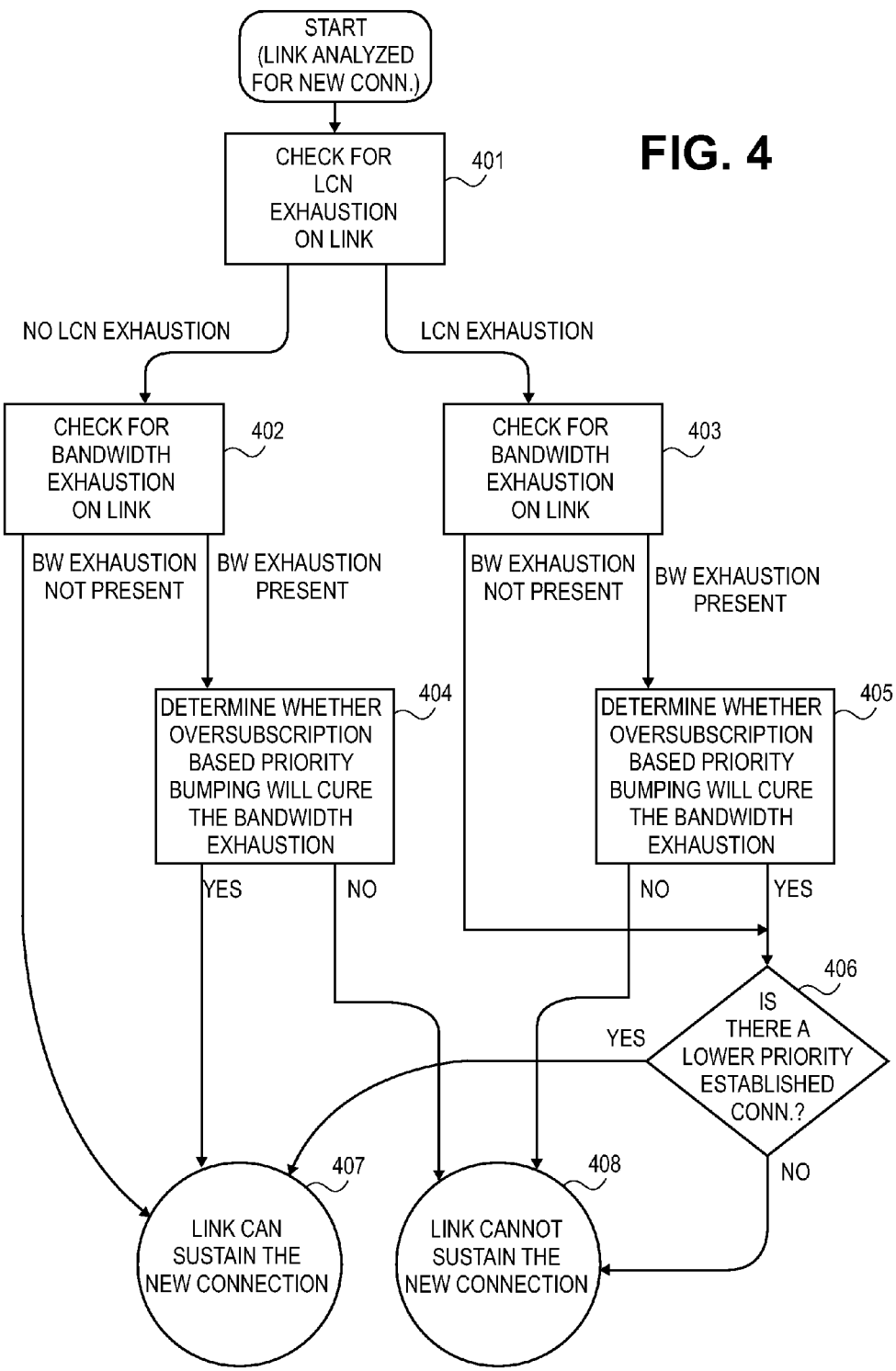

METHOD AND APPARATUS FOR IMPROVED PRIORITY BASED CONNECTION ESTABLISHMENT WITHIN A PNNI ATM NETWORK

FIELD OF THE INVENTION

The field of invention relates to networking, generally; and, more specifically, to a method and apparatus for improved priority based connection establishment within a PNNI ATM network.

BACKGROUND

1. PVCs, SVCs and SPVCs

An exemplary Private Network Node Interface (PNNI) Asynchronous Transfer Mode (ATM) network 101 is shown in FIG. 1. ATM is a networking technology that transports information with "cells" of data. As such, if a significantly sized body of information (e.g., a document or file) is to be transported across an ATM network, the body of information is effectively "broken down" into a plurality of cells. The plurality of cells are then individually sent across the network and reassembled at the receiving end in order to reconstruct the original body of information.

The term "connection" or "circuit" is often used to describe a predefined path through a network. Typically, when a body of information is to be transported over a network, a connection is setup beforehand that establishes (in some manner and to some extent) the path that the cells will take. Various types of connections may be used within an ATM network 101. These include: 1) permanent virtual circuits (PVCs); 2) switched virtual circuits (SVCs); and 3) soft permanent virtual circuits (SPVCs).

In the case of PVCs, a quasi-permanent connection is established (e.g., a connection that lasts for days, weeks, months, etc.). PVCs are often used in situations where a large corporate user desires to permanently clear a guaranteed pipe through the network 100 from one large office to another large office. For example, if node $105_1$ corresponds to the Customer Premise Equipment (CPE) of a first corporate office and node $105_2$ corresponds to the CPE of a second corporate office, a PVC may be established that couples nodes $102_1$, $102_4$, $102_7$ and network lines $103_3$, $103_{11}$ together (in order to form an end-to-end path through the network 100 between CPEs $105_1$ and $105_2$).

Generally, the amount of traffic (e.g., as between two large corporate offices) and the extent of the usage (e.g., every business day for the foreseeable future) justifies the costs associated with dedicating, in a quasi-permanent fashion, a fixed amount of the network's resources to one particular pathway. Typically, a PVC is manually configured by a network manager from a network management control station 104. As such, commands are issued from the network control station 104 to the various nodes in the network 101 that "make up" the PVC (so that the lookup tables, etc. within these nodes can be properly updated).

Another characteristic of a PVC is that a PVC user simply directs traffic into the network 101 (e.g., from node $105_1$) with little or no formal request for transportation services from the network 101. For example, typically, a PVC user at node $105_1$ will send ATM cells having the PVC's VPI/VCI across the ATM User Network Interface (UNI) at link $103_1$. Based upon the VPI/VCI information, node $102_1$ (e.g., as well as subsequent nodes along the PVC path) will be able to properly switch the cells onto a link that corresponds to the PVC path. Thus, because the connection is quasi-permanent and has already been established, there is little or no procedural overhead associated with connection setup (such as a SETUP request message and the like). The user is provided an appropriate VPI/VCI well beforehand (e.g., shortly after PVC setup) which is invoked each time thereafter by the user when the services of the PVC are desired.

SVCs, on the other hand, are established on a temporary basis rather than a quasi-permanent basis. SVCs efficiently utilize the resources of a network if the network has to support a large number of different connection paths over a fairly brief period of time (e.g., seconds, minutes, hours). In contrast to PVCs, SVCs are usually established on a "call-by-call" basis and therefore have: 1) some form of formal user request to the network 101 for transportation services; and, 2) a connection "setup" procedure that follows the request for transportation services and a connection "tear down" procedure that follows the successful performance of the requested transportation services.

The connection setup/tear down procedures may be viewed as the "automatic" configuration of a connection within the network rather than manual configuration from a network management control station 104. PNNI is a routing and signaling protocol that determines and establishes connection paths. The PNNI routing protocol is executed on the source endpoint (e.g., source endpoint $102_1$ for connections initiated from originating node $105_1$), and is often referred to as a "source" routing protocol. An example of PNNI's routing and signaling techniques are provided immediately below.

If node $105_1$ (the "originating" node) desires to send information to node $105_2$ (the "target" node), the originating node $105_1$ will effectively request the network 101 for a connection to be established between nodes $105_1$ and node $105_2$. Typically, this request takes the form of a SETUP message that is passed over the ATM UNI at link $103_1$. The access node $102_1$ (which may be referred to as the source endpoint node) receives the SETUP message and determines an appropriate path for the connection through the network via the PNNI routing protocol.

The SETUP message then traverses the network 101 to the destination endpoint node $102_7$. When the SETUP message is received at the destination endpoint node $102_7$, a CONNECT message is issued from the destination endpoint node $102_7$ to the source endpoint node $102_1$. The CONNECT message "bounces", node-by-node, along the connection path to the source endpoint node $102_1$. Each node that receives the CONNECT message updates its lookup table (or other routing/switching platform) with an appropriate reference to the connection being established. When the source endpoint node $102_1$ receives the CONNECT message, the VPI/VCI for the connection is passed to the user at the ATM UNI (along link $103_1$), the connection is established, and transportation services may commence. After the transportation services are complete, the connection is torndown in a manner similar to that in which it was established.

An SPVC is often viewed as a blending of an SVC and a PVC. SPVCs are often used to provide guaranteed bandwidth to a particular user (such that the user enjoys service as if a permanent pipe has been established through the network 101) while, simultaneously, the network 101 is allowed to flexibly adapt to different connection paths over brief periods of time (by establishing each SPVC communication with connection setup and tear down procedures). In order to implement an SPVC service, the endpoint nodes of the ATM network 101 (e.g., source node $102_1$ and destination node $102_7$) are configured to behave like PVC nodes with respect to the user (e.g., along the ATM UNI at link $103_1$) while behaving like SVC nodes within the ATM network 101 itself.

With an SPVC, the source and destination endpoint nodes $102_1$ and $102_7$ are usually manually configured by the network management station 104 to provide a PVC interface to the users at node $105_1$ (and at node $105_2$). That is, for example, a quasi permanent VPI/VCI is provided to the user that is to be invoked each time the services of the SPVC are desired. Upon the receipt of ATM cells having this VPI/VCI information, however, the endpoint source node $102_1$ triggers the release of a SETUP message which traverses the network 101 to destination endpoint node $102_7$. A CONNECT message is returned to the endpoint source node $102_1$, and the SPVC is established.

2. Priority Based Connection Bumping

A problem with both SVC and SPVC type connections is that, traditionally, the connection establishment process does not execute a "true" priority bumping scheme with respect to the network 101 as a whole. Priority relates to the notion that the various connections supported by the network 101 are to be prioritized in some manner with respect to one another. For example, the network 101 may be configured to give cells associated with higher priority connections lower end-to-end delay across the network 101 than cells associated with lower priority connections.

With respect to the connection establishment process, under a process that may be referred to as "priority bumping", higher priority connections are established at the expense of lower priority connections. For example, if the network 101 is supporting a large number of low priority connections at the same moment it happens to receive a request for a high priority connection, one or more of the low priority connections can be "dropped" so that the high priority connection can be established.

The PNNI routing and signaling scheme is often said to be a "source routing" scheme because the appropriate path for a network connection is determined at the node that acts as its source endpoint or "source node" (e.g., node 1021 for connections initiated by node 1051). Patent application Ser. No. 09/996,485 filed on Nov. 27, 2001, which issued as U.S. Pat. No. 7,480,239 B1 on Jan. 20, 2009 (hereinafter, "the earlier patent") and which has been assigned to the assignee of the present application, describes a method and apparatus for priority based connection establishment within a PNNI ATM network that allows for bumping of connections.

According to teachings described therein, a source node is made aware of the connections being supported on other nodes in terms of their priority and the bandwidth they consume. Specifically a breakdown of the bandwidth consumption per priority, for each link within the ATM network, is broadcast throughout the network. By collecting these broadcasts a source node can determine, for each link that a prospective new connection having a specific priority might traverse, whether sufficient bandwidth exists for the new connection. That is, the source node is allowed to consider the bumping of lower priority connections on the link so as to free up bandwidth for the new, higher priority connection.

However, even though network wide priority bumping is achievable, certain features are not specifically addressed. These include over-subscription and logical channel (LCN) exhaustion.

FIGURES

The present invention is illustrated by way of example, and not limitation, in the Figures of the accompanying drawings in which FIG. 1 shows an embodiment of a PNNI ATM network;

FIG. 4 shows a methodology for determining if a link can sustain a prospective new connection;

Figure 5A:
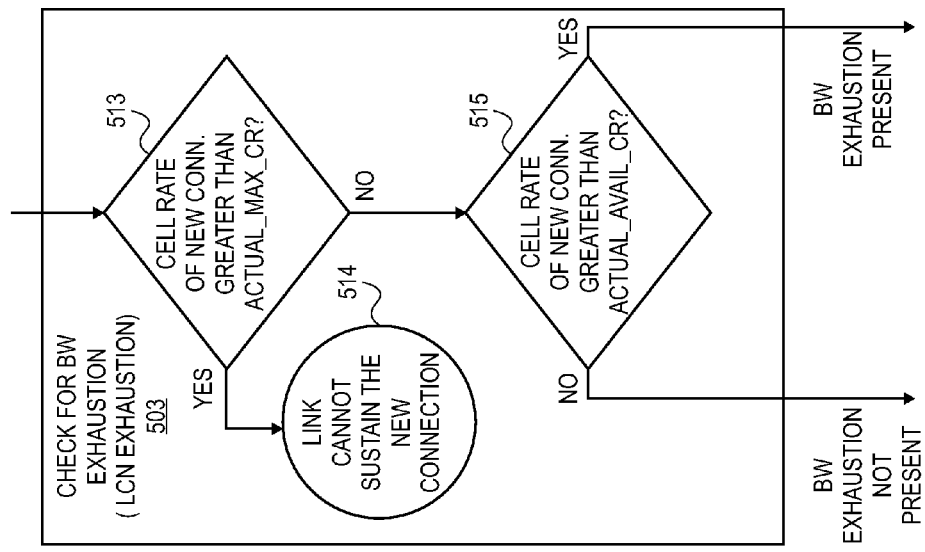
Figure 5B:
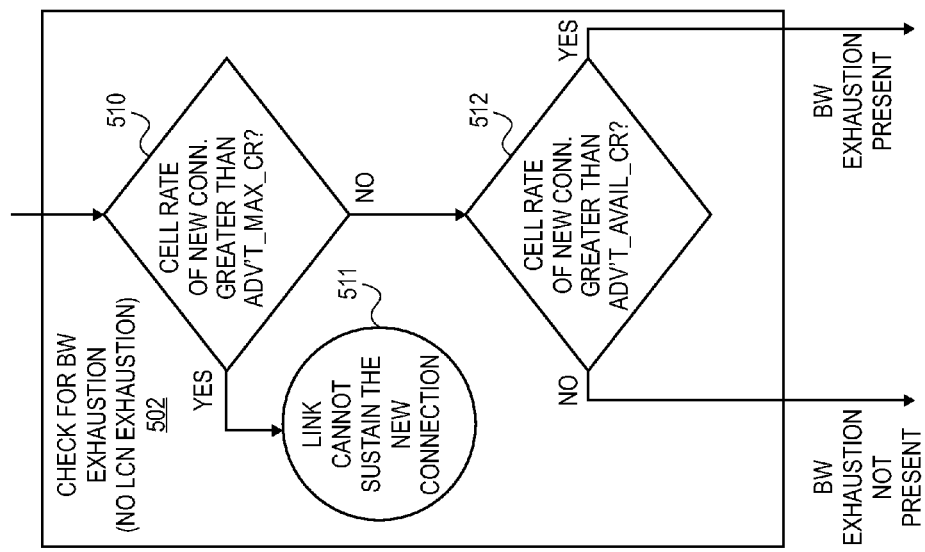
Figure 6A:
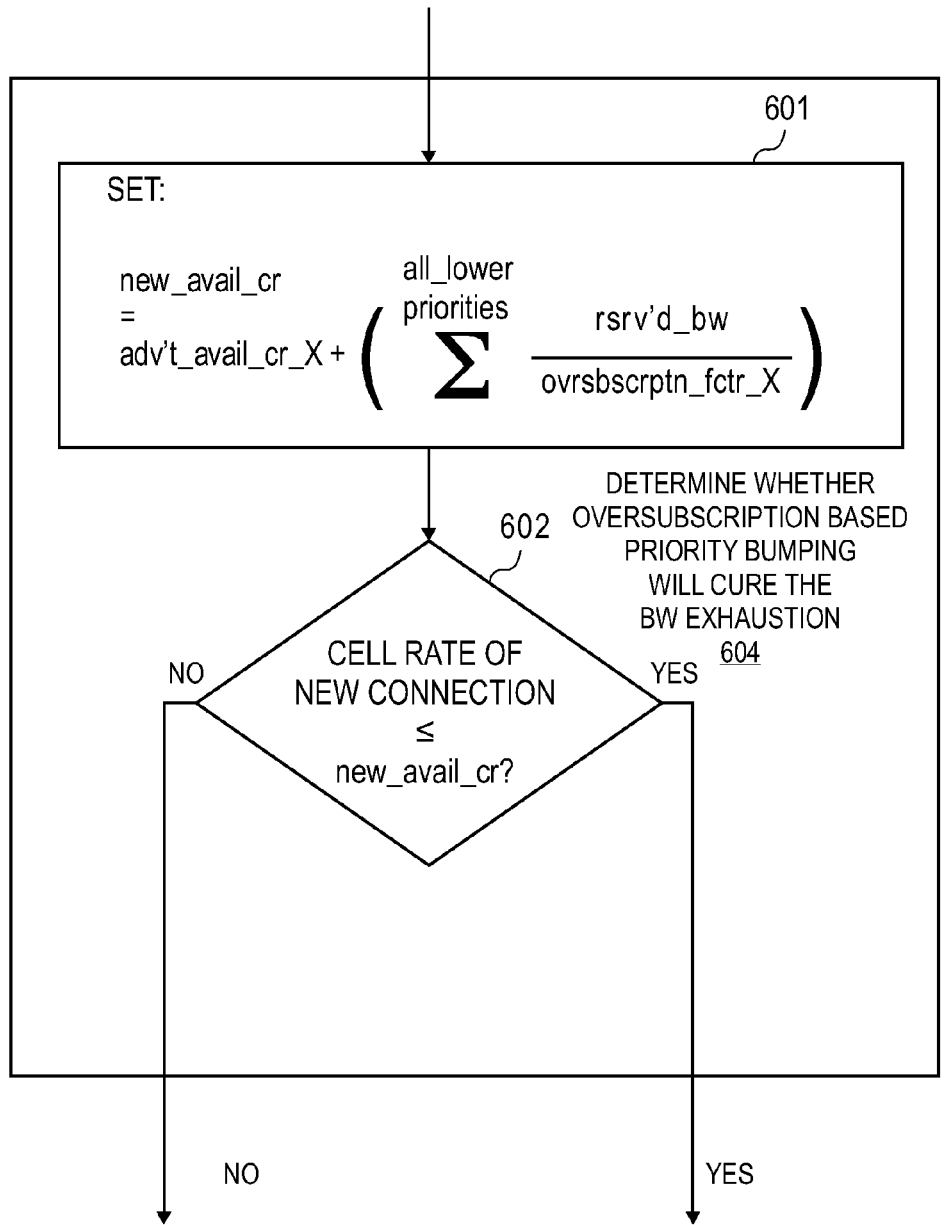
Figure 6B:
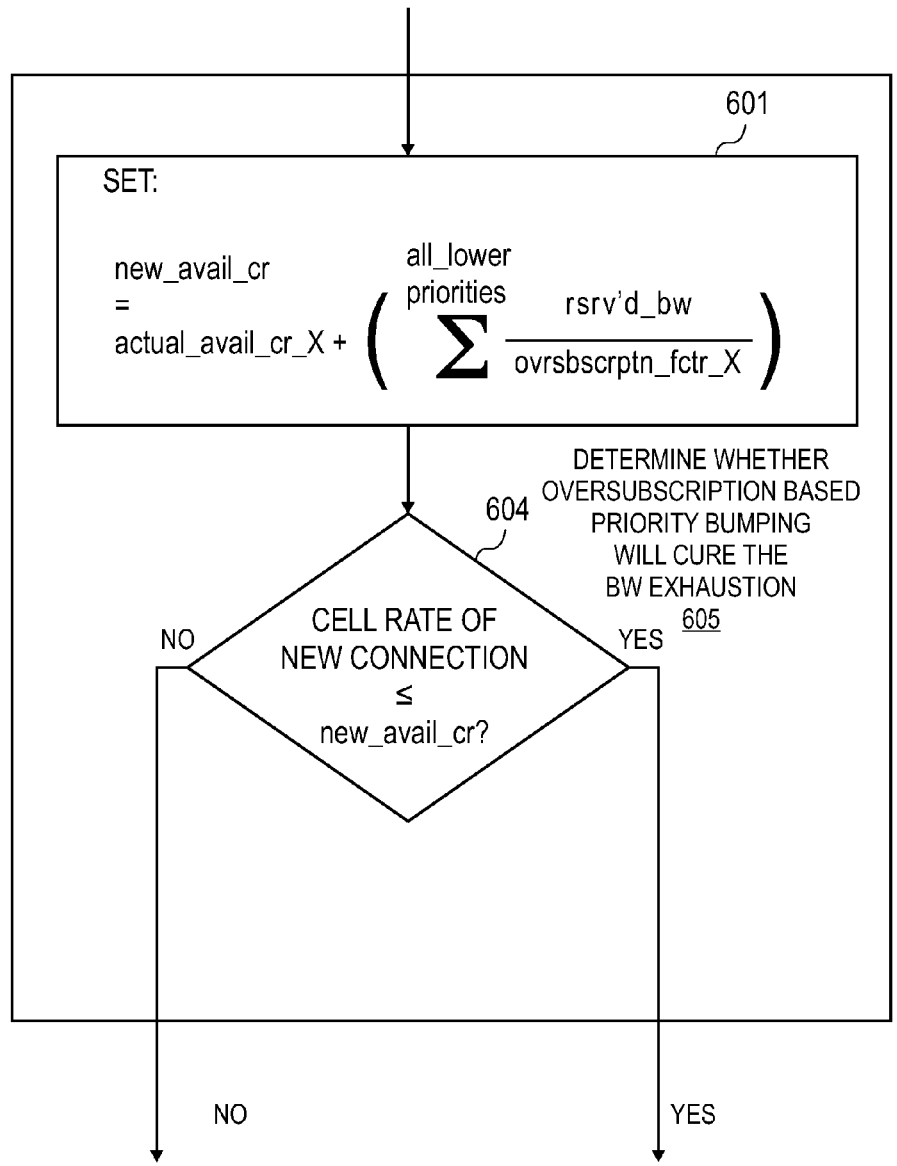
Figure 7:
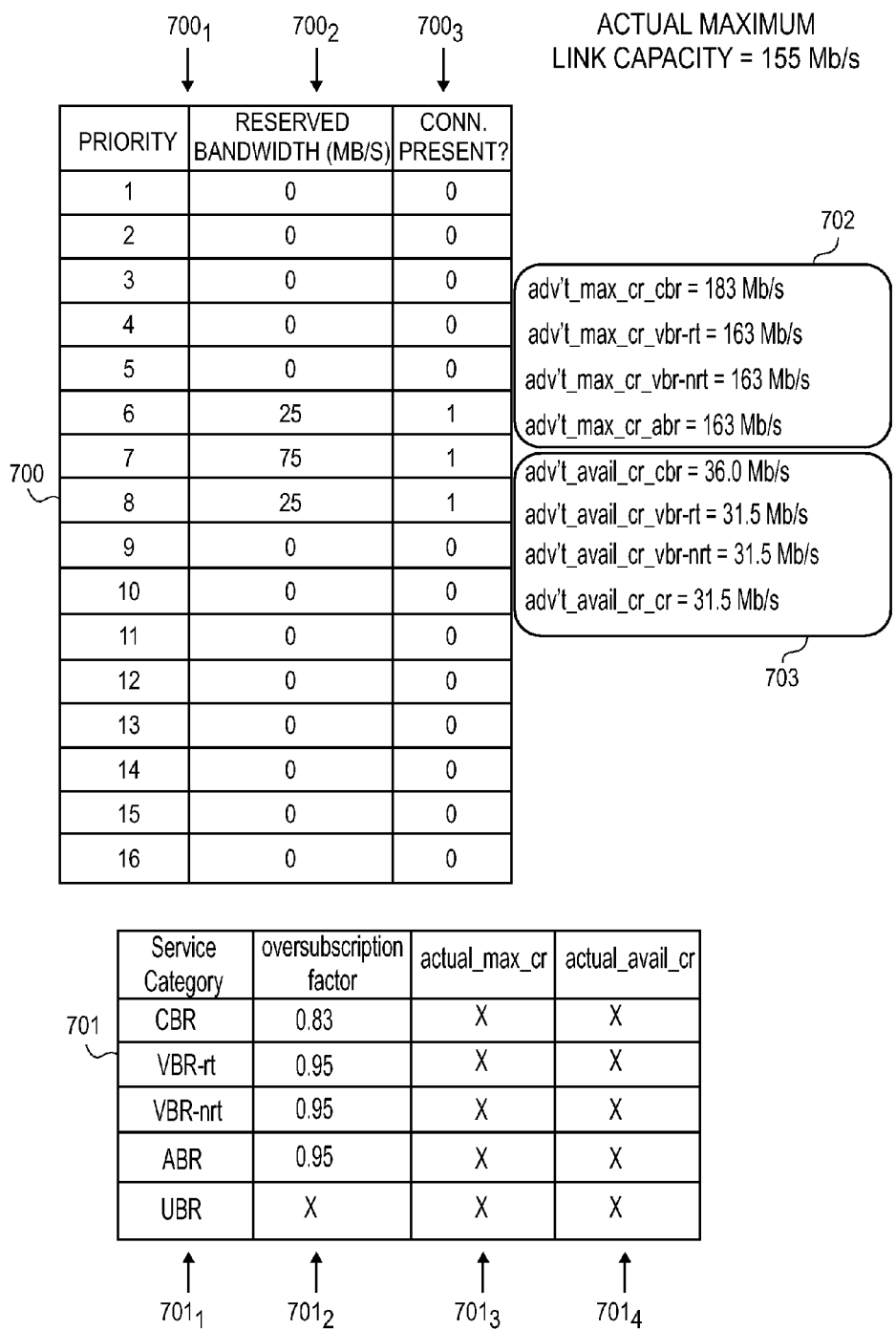
Figure 8:
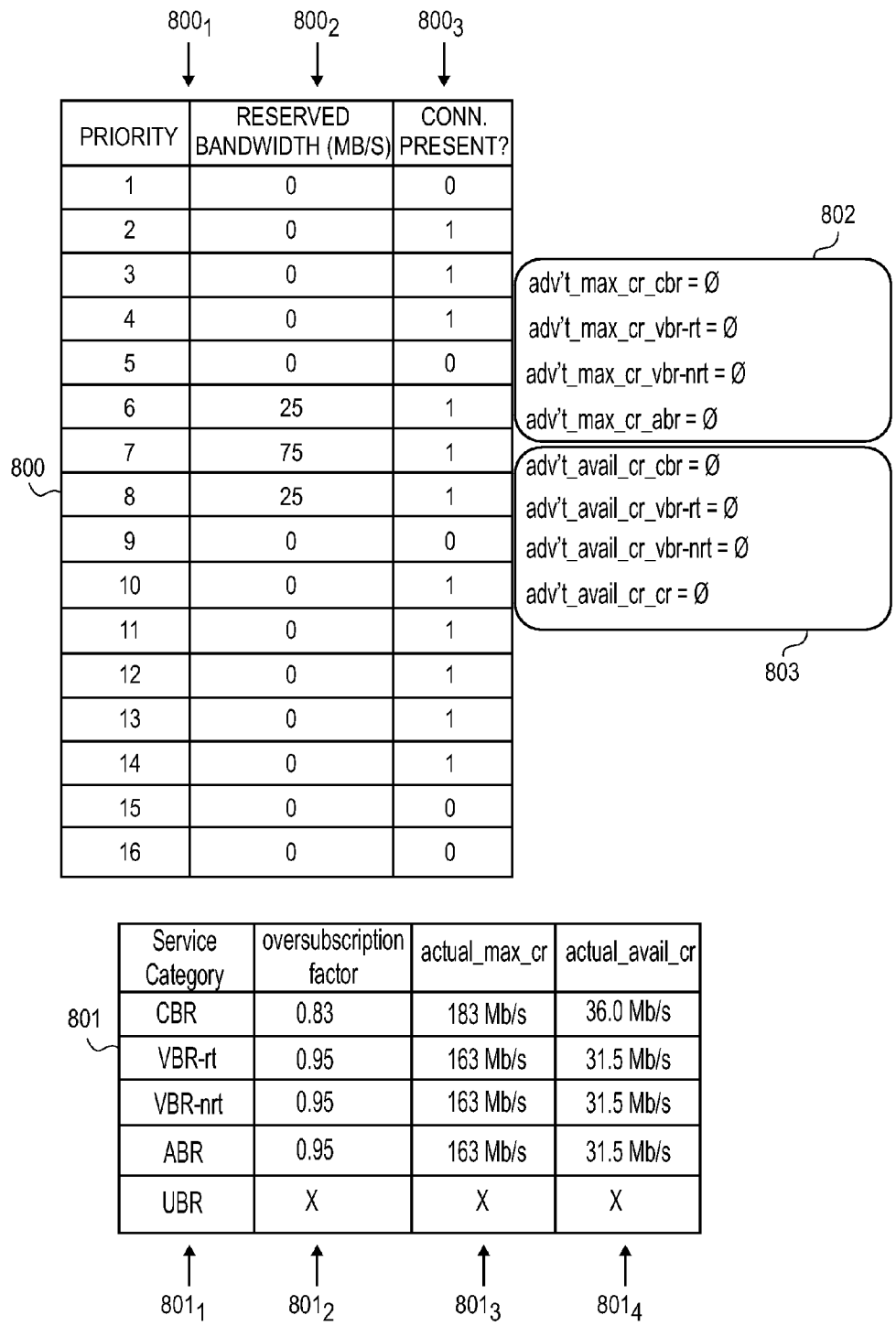
Figure 9:
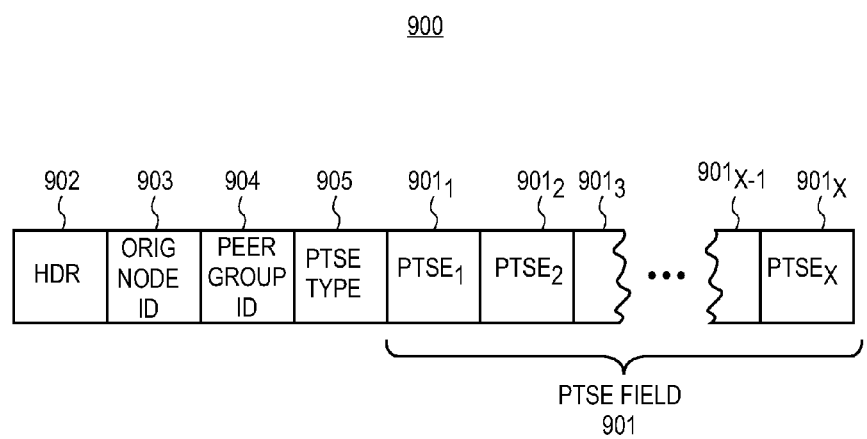
Figure 10:
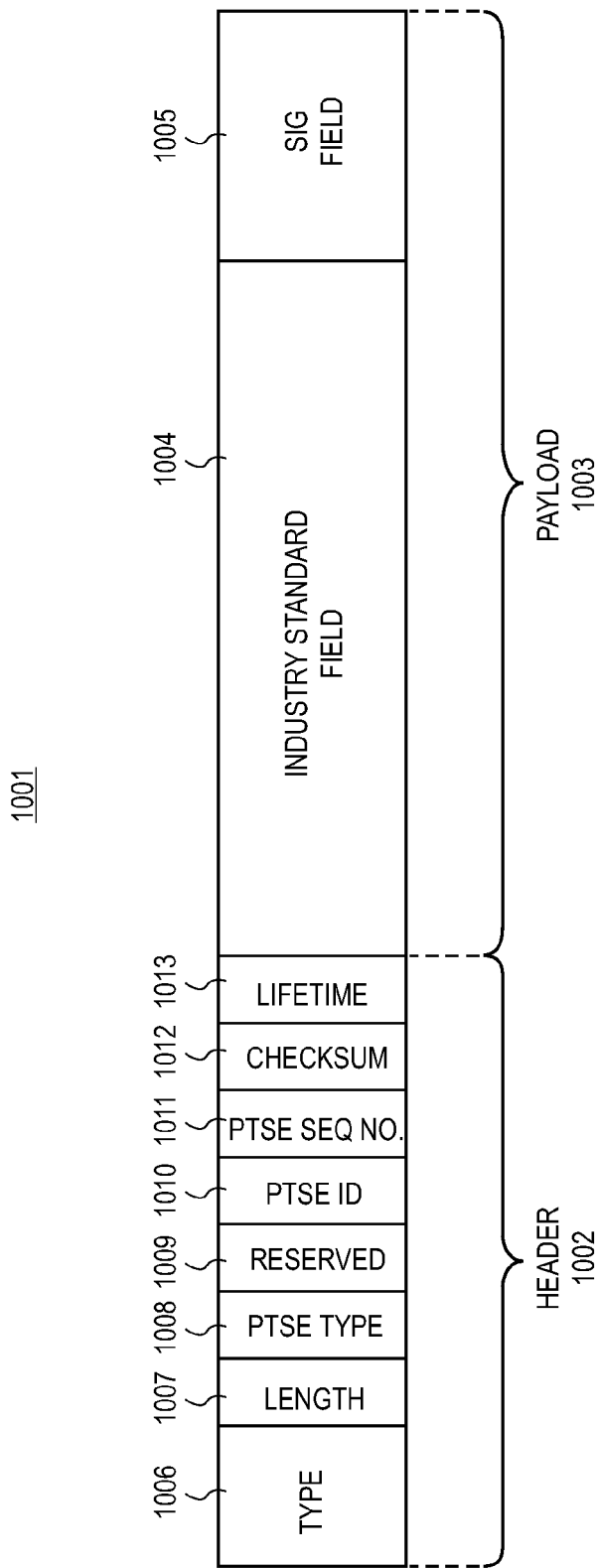
Figure 11:
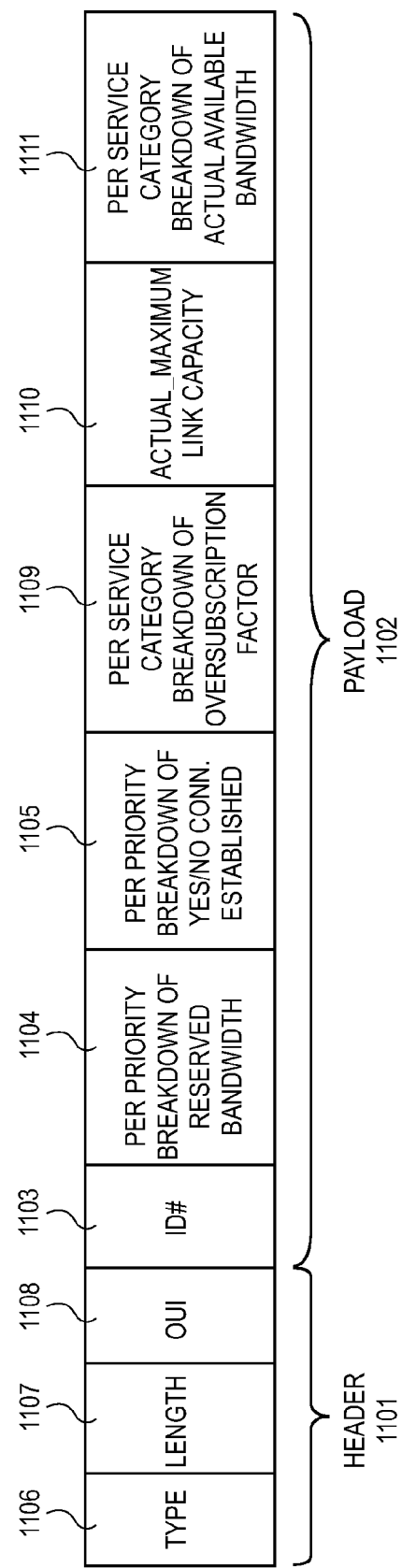
Figure 12:
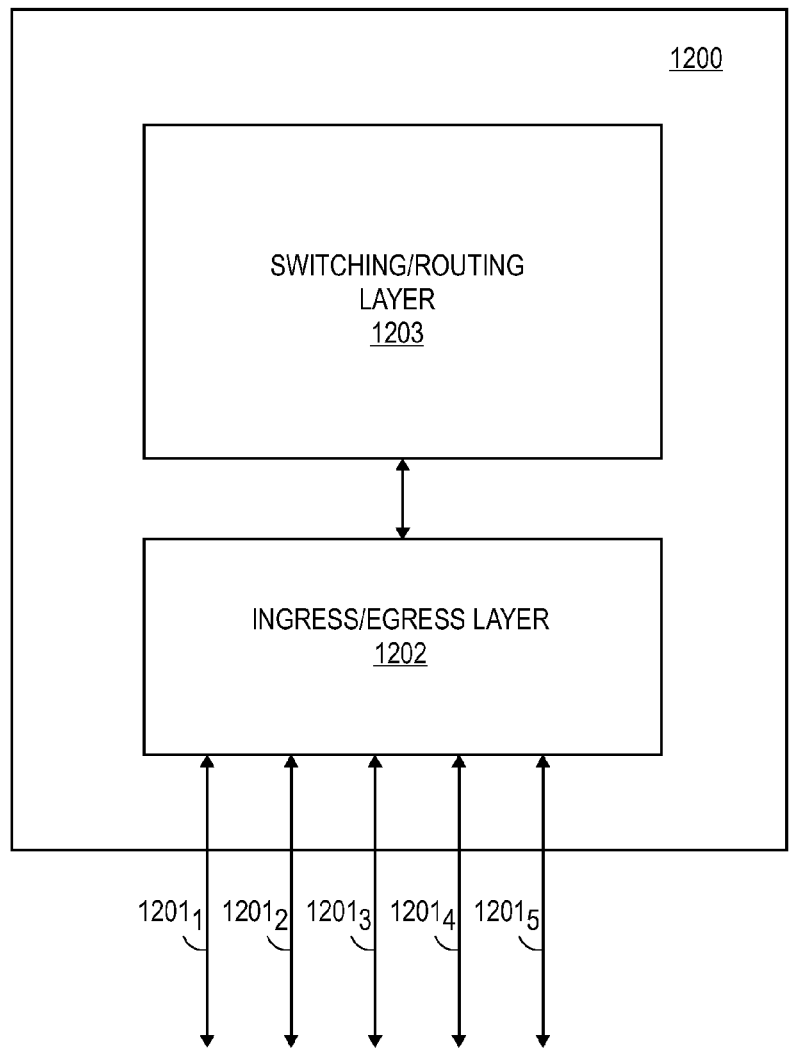

FIGS. 5a, and 5b show embodiments of methodologies for checking for bandwidth exhaustion for non LCN exhaustion and LCN exhaustion conditions, respectively;

FIGS. 6a and 6b show embodiments for determining whether or not over-subscription based priority bumping can cure a bandwidth exhaustion condition for non LCN exhaustion and LCN exhaustion conditions, respectively;

FIG. 7 shows a first exemplary depiction of specific broadcasted content for a link that is not within an LCN exhaustion condition;

FIG. 8 shows a second exemplary depiction of specific broadcasted content for a link that is within an LCN exhaustion condition;

FIG. 9 shows an embodiment of a PNNI Topology State Packet (PTSP);

FIG. 10 shows an embodiment of a PNNI Topology State Element (PTSE) that may be embedded within the PTSP of FIG. 9;

FIG. 11 shows an embodiment of a System Capabilities Information Group (SIG) field that may be embedded within the PTSE of FIG. 10;

FIG. 12 shows an embodiment of a networking node.

DESCRIPTION 1.0 Overview

Figure 2:
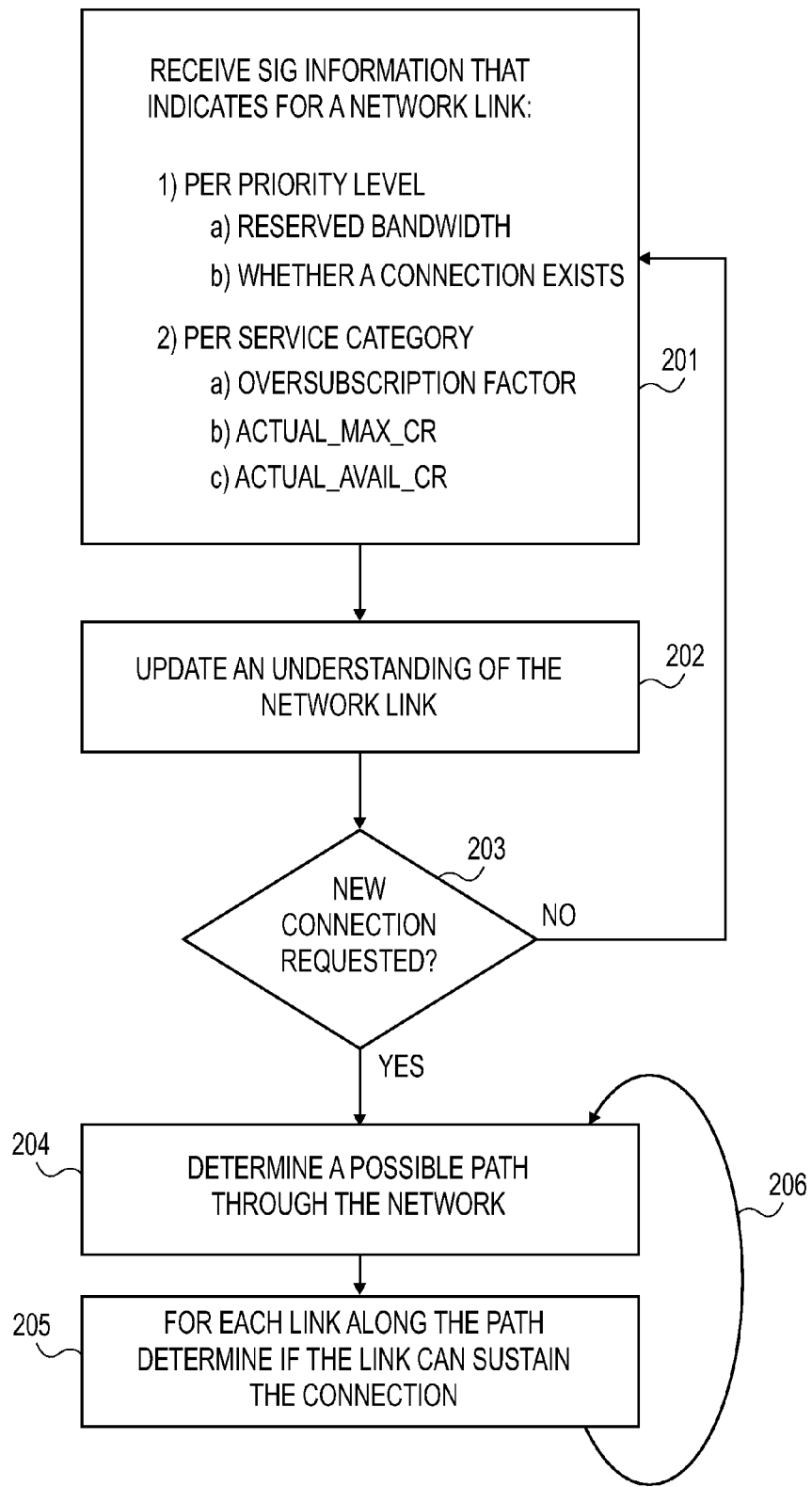
FIG. 2 shows an embodiment of a methodology for priority based connection establishment within a PNNI ATM network capable of taking into account over-subscription and logical channel exhaustion.

FIG. 2 shows an embodiment of a methodology that allows for priority based connection bumping and that accounts for both LCN exhaustion and oversubscription. LCN exhaustion and oversubscription are concepts that are described in more detail further below. To quickly summarize, however, LCN exhaustion is a state that arises when a maximum permissible number of connections has been reached; and, oversubscription is the notion that the summation of the bit rates for each active connection on a link may exceed the link's bit rate capacity.

Figure 3:
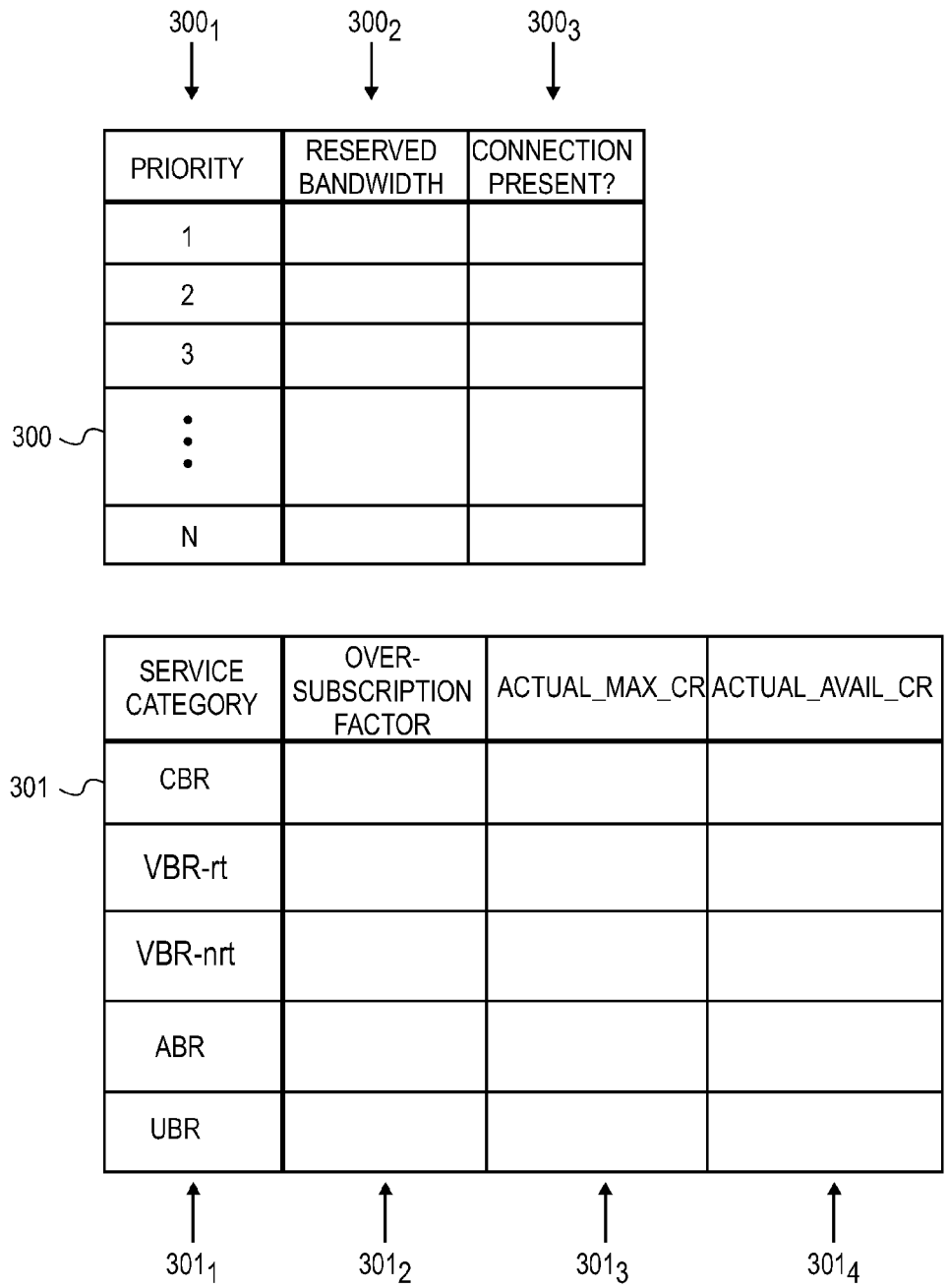
FIG. 3 shows a depiction of information that is broadcasted within an ATM network to support the methodology of FIG. 2.

According to the approach described by the methodology of FIG. 2, the nodes within an ATM network "broadcast" to one another specific forms of information on a per link basis. An embodiment of the information broadcast for each link in the network is provided in FIG. 3. Referring initially to FIG. 3, note that the per link broadcasts may include "per priority level" information 300 and "per service category" information. The per priority level information 300 includes: 1) a breakdown $300_2$ of the amount of bandwidth reserved to each priority level $300_1$ supported by the network; and, 2) a breakdown $300_3$ as to whether or not at least one connection exists for each priority level $300_1$ supported by the network. The per service category information 301 includes: 1) a breakdown of over-subscription factor $301_2$ specified for various types of service category $301_1$ supported by the network; 2) a breakdown $301_3$ of actual maximum cell rate across the various types of service categories $301_1$; and, 3) a breakdown $301_4$ of actual available cell rate across the various types of service categories $301_1$.

The breakdown of the amount of bandwidth 3002 reserved to each priority level 3001 supported by the network corresponds largely to the broadcasted information described in the earlier patent. Breakdowns 3003 and 3011 through 3014, however, correspond to additional broadcasted information that allows a source node to consider both over-subscription and LCN exhaustion. Service category describes the Quality of Service (QoS) of a connection. Typically, in order to support robust QoS flavors to users of the network, different types of service categories can be defined. The service category type for a connection is typically specified in the connection's corresponding SETUP message.

FIG. 3 illustrates an embodiment of five different service categories $301_1$. These include: 1) continuous bit rate (CBR); 2) "non real time" variable bit rate (VBR-nrt); 3) "real time" variable bit rate (VBR-rt); 4) available bit rate (ABR); and, 5) unspecified bit rate (UBR). A CBR connection is a connection that transports information at an approximately constant data rate. A VBR connection is a connection that transports information at a varying data rate. Two types of VBRs may exist (e.g., a first for "real time" traffic (VBR-rt) and a second for "non real time" traffic (VBR-nrt). An ABR connection has its data rate specified by whatever rate is available. A UBR connection is a connection whose data rate is unspecified. Those of ordinary skill will appreciate that, to the extent other service category types can be defined, they may be added along with or in place of any of the service categories listed above.

Uses of the various forms of information observed in FIG. 3 will become more apparent in the discussion that follows. Referring back to FIG. 2, the nodes within an ATM network "broadcast" to one another the specific forms of per priority and per service category information (e.g., observed in FIG. 3) for each link in the network. A link is a physical resource for transporting information between network nodes (e.g., a fiber optic or copper cable). As such, a source node can develop a full perspective as to the status of each link in the network and can decide, in light of this perspective, whether or not the network as a whole can support a newly requested connection.

FIG. 2 describes a methodology performed by any source node. According to the methodologies of FIG. 3, a prospective source node will receive 201 System capabilities Information Group (SIG) information (from the other nodes within the PNNI network in which it resides) that includes the per priority and per service category breakdown information. SIG information, as described in more detail further below, is a mechanism that has been established by the PNNI routing scheme for the passing of information that has not been formally provided for by the PNNI standard.

After the SIG information has been received 201, the prospective source endpoint node will update 202 its present understanding of the network. In various embodiments, the understanding of the network corresponds at least to, for each link in the network, the collection of its latest SIG information. When a new connection is requested 203 (e.g., formally in the case of an SVC or informally in the case of an SPVC), the prospective source node attempts to determine 204 a possible path through the network. For example, in various "path-recursive" approaches, the prospective source node is configured to determine a "first pass" path (e.g., according to a PNNI compliant source routing algorithm) through the network. Then, once the "first pass" path has been determined, each link that would be used along the path is analyzed (as understood via the network understanding that has been developed 202) to see if it can sustain the new connection 205.

If each link along the path can sustain the connection, the connection path is established (e.g., which may involve the dropping of lower priority connections) via the issuance of a SETUP message from the source node. If not, an alternative "second pass" path is determined and analyzed in a similar fashion. The process continues in a recursive fashion until a workable path is identified (in which case the connection is ultimately established); or, alternatively, is not identified (in which case the connection is not ultimately established). Here, loop 206 helps demonstrate the recursive nature of this path finding approach. Alternatively, a set of possible paths are first identified and then a "best one" is selected.

2.0 Per-Link Analysis

FIG. 4 shows an embodiment of a methodology for determining whether or not a link can sustain a new connection. According to the methodology of FIG. 4, the decision as to whether or not the link can or cannot be sustained is influenced by whether or not the link is in a bandwidth exhaustion state and/or a logical channel (LCN) exhaustion state. Here, it helps to view a link as having constraints in two dimensions: bandwidth and number of connections. In the case of bandwidth, a link cannot carry information at rate that is higher than the rate of the link itself. That is, for example, a 622 Mb/s link cannot transport information at a rate higher than 622 Mb/s. In the case of logical channels, each connection can be viewed as a "logical channel" within the network. Here, some degree of overhead is involved in keeping track of each connection; and, moreover, there are limits to the number of connections that can be tracked. LCN exhaustion occurs when a maximum number of connections that can be kept track of have been reached.

According to one approach, when LCN exhaustion is reached for a link, the maximum cell rate that is advertised for the link (adv't_max_cr) and the available cell rate (adv't_avail_cr) are both set to be equal to zero. Here, in order to implement source routing, the PNNI standard embraces an approach where maximum and available cell rates are broadcast ("advertised") around the network. Accordingly, in order to handle LCN exhaustion cases, an approach may be used that dictates that any link deemed to be in an LCN exhaustion state is to have its broadcasted adv't_max_cr and adv't_avail_cr values set equal to zero. By so doing, a routing algorithm can recognize the presence of LCN exhaustion on a given link; and, likewise, prevent the routing of additional connections on the link until the LCN exhaustion state is removed.

According to the methodology of FIG. 4, a determination is made as to whether or not the link is in an LCN exhaustion state 401. Here, the determination 401 can be made in accordance with the approach described above (i.e., adv't_max_cr=adv't_avail_cr=0); or, other suitable approaches may be used. Regardless if LCN exhaustion exists or does not exist, an additional inquiry 402, 403 is made to see if bandwidth exhaustion is also present on the link. Bandwidth exhaustion can arise for a link when the bandwidth for a new requesting connection exceeds the link's advertised available capacity (adv't_avail_cr) for the connection. More details regarding bandwidth exhaustion are provided in more detail further below. Irregardless, because the impact of bandwidth exhaustion may be different depending on whether LCN exhaustion exists or not, a pair of such inquiries 402, 403 are observed in FIG. 4. Moreover, the bandwidth exhaustion inquiries 402, 403 themselves are apt to be different as described in more detail below.

FIGS. 5a and 5b together show a pair of bandwidth exhaustion inquiry methodologies 502, 503. FIG. 5a shows an inquiry into whether or not bandwidth exhaustion exists if LCN exhaustion is not present. FIG. 5b shows an inquiry into whether or not bandwidth exhaustion exists if LCN exhaustion is present. Referring back to FIG. 4, if bandwidth exhaustion exists for either the LCN exhaustion or non-LCN exhaustion cases, a determination 404, 405 is made to see if oversubscription based priority bumping can cure the bandwidth exhaustion issue. FIG. 6a shows an embodiment of a methodology that may be used to implement methodology 404 of FIG. 4; FIG. 6b shows an embodiment of a methodology that may be used to implement methodology 404 of FIG. 4.

Recall from above that bandwidth is a hard constraint on the use of a link. That is, a link cannot carry information at rate that is higher than the rate of the link itself. However, even though a link cannot carry information at a rate that is higher than the rate of the link itself, a network may nevertheless be designed to "over-subscribe" its links. Over-subscription is the reservation of bandwidth on a link that exceeds the link's maximum bandwidth. By over-subscribing a link the network is taking a risk that, at any given time, one or more of the established connections for the link will be "quiet" (e.g., not actually be transferring information over the link). If one or more connections being supported by the link is expected to be quiet at any given time, the link can support a set of connections whose total combined bandwidth exceeds the bandwidth capacity of the link (because the link is not expected to be asked to carry the total combined bandwidth of all its connections at any given time).

In order to efficiently describe the myriad of link conditions that the methodology of FIG. 4 is able to handle, a series of examples is discussed in detail below. A first set of examples relate to a link that is not LCN exhausted and whose set of priority based and service category based breakdowns are those observed in FIG. 7. A second set of examples relate to a link that is LCN exhausted and whose set of priority based and service category based breakdowns are those observed in FIG. 8. Through the discussion of these examples, an understanding of the methodologies observed in FIGS. 5a, 5b and 6a, 6b will be achieved.

2.1 Non LCN Exhaustion

FIG. 7 shows an exemplary set of priority based 700 and service category based 701 breakdowns for a link that is not in an LCN exhaustion state. As such, if the link characterized by the breakdowns 700, 701 of FIG. 7 is to be analyzed according to the methodology of FIG. 4 to determine whether or not the link can support a new prospective connection, the "non LCN exhaustion" flow starting at block 402 applies. In order to flesh out different aspects of the non LCN exhaustion methodology, the discussion below explores the reaching of specific determinations for the link in view of different exemplary connections that each share the characteristics outlined in FIG. 7.

Before presenting any of these new connections, however, some of the specific link characteristics observed in FIG. 7 will be described in detail. Firstly, note that the link actually has a maximum bandwidth capacity of 155 Mb/s. Advertised throughout the network is the link's maximum bandwidth for each service category type: adv't_max_cr_X 702; and, the link's maximum available bandwidth for each service category type: adv't_avail_cr_X 703 (noting that cell rate and bit rate can be easily related to one another if the number of bits per cell is known). Both the adv't_max_cr 702 and the adv't_avail_cr parameters 703 are alluded to in the present PNNI standard.

Each of the adv't_max_cr_X parameters 702 is the broadcasted maximum capacity of a link for the service category "X". Each of the adv't_avail_cr_X parameters 703 is the amount of bandwidth that may yet be reserved on the link for connections yet to be established of the service category type "X". Note that an available bandwidth term for an unspecified bit rate connection (e.g., UBR) is of no significance and is therefore not included in the family 703 of available bandwidth settings.

With the actual link capacity being 155 Mb/s, the adv't_max_cr_X parameters 702 indicate that over-subscription is permitted for the link described by FIG. 7. That is, each of the adv't_max_cr_X parameters 702 show a maximum link capacity higher than the actual link capacity. In an embodiment to which the depiction of FIG. 7 corresponds, for service category type "X", the adv't_max_cr_X parameter is the actual link capacity (i.e., 155 Mb/s) normalized by an oversubscription factor assigned to service category type X. Advertised oversubscription factors are listed in column $701_2$ for each service category type $701_1$. Thus, the adv't_max_cr_cbr parameter is 183 Mb/s because 155 Mb/s/0.83=183 Mb/s, the adv't_max_cr_vbr-nrt parameter is 163 Mb/s because 155 Mb/s/0.95=163 Mb/s, etc.

The available bandwidth parameters adv't_avail_cr_X parameters 703 also reflect oversubscription, Reference to the priority based reserved bandwidth breakdown $700_2$ will make this more clear. The reserved bandwidth breakdown $700_2$ illustrates how the bandwidth resources of the link have been utilized at each priority level. From the exemplary depiction of FIG. 7 there are sixteen priority levels—but bandwidth has been reserved on the link for already established connections at only three priority levels. Specifically, 25 Mb/s has already been reserved at priority 6, 75 Mb/s has already been reserved at priority 7 and 25 Mb/s has already been reserved at priority 8. Adding together the reserved bandwidth of the link results in 125 Mb/s (i.e., 25+75+25).

Given that the link characterized by FIG. 7 has a maximum capacity of 155 Mb/s, if over-subscription were not permitted for the link, the adv't_avail_cr parameter for any of the service categories would be set to 30 Mb/s (i.e., 155 Mb/s−125 Mb/s=30 Mb/s). However, note that the adv't_avail_cr parameter for a new CBR connection is 36 Mb/s; while, the adv't_avail_cr parameter for a new connection of any other non UBR service category is 31.5 Mb/s. Therefore, the link characterized by FIG. 7 is configured so as to allow over-subscription of up to 6 Mb/s worth of bandwidth beyond its actual limit of 155 Mb/s for a new CBR connection or up to 1.5 Mb/s worth of bandwidth beyond its actual limit of 155 Mb/s for any other new non UBR connection.

The connection present breakdown $700_3$ illustrates, for each priority level, whether or not at least one connection is being transported by the link. From the exemplary depiction of FIG. 7 it is clear that connections for only the $6^{th}$, $7^{th}$ and $8^{th}$ priority levels are currently being transported by the link; and that, no connections are being transported by the link for the $1^{st}$ through $5^{th}$ and $9^{th}$ through $16^{th}$ priority levels (because, the $6^{th}$, $7^{th}$ and $8^{th}$ priority levels are set equal to "1" and the $1^{st}$ through $5^{th}$ and $9^{th}$ through $16^{th}$ priority levels are set equal to "0"). Note that it is possible that more than one connection exists for any of the $6^{th}$, $7^{th}$ and $8^{th}$ priority levels.

The service category breakdowns 701 of FIG. 7 list the over-subscription factor $701_2$ for each service category $701_1$. The actual_max_cr and actual_avail_cr parameters are not used for a link in a non LCN exhaustion state; and, therefore are shown in FIG. 7 as being devoid of substantive content. An over-subscription factor is any parameter from which the appropriate amount of over-subscription bandwidth for a link can be calculated. In the particular format of FIG. 7, each of the over-subscription factors correspond to K where:

$1/K=1+a$; and where, a=the over-subscription expressed as a decimal percentage above the maximum capacity rate of the link.

For example, for an over-subscription that corresponds to 20% above the maximum capacity of the link, a=0.20. Here, solving $1/K=1.2$ for K yields K=0.83. Thus, referring to the column of over-subscription factors observed in FIG. 7, note that CBR connections can enjoy 20% over-subscription because K is observed to be set equal to 0.83. Note also that 20% over-subscription for CBR connections is consistent with the adv't_avail_cr_cbr setting of 36 Mb/s because 1.2 (155 Mb/s–125 Mb/s)=1.2(30) Mb/s=36 Mb/s. The remaining over-subscription factors correspond to 5% over-subscription beyond the maximum capacity rate of the link (i.e., $1/K=1/0.95=1.05$). Note that the over-subscription factor for each service category could alternatively be calculated (rather than broadcasted) directly from knowledge of the actual maximum capacity of the link (155 Mb/s) and the adv't_max_cr parameters 702; or, from knowledge of the actual maximum capacity of the link (155 Mb/s), the bandwidth breakdown of the link $700_2$, and the adv't_avail_cr_X parameters 703.

With a review of the content of the link characteristics expressed in FIG. 7, a few examples of potential new connections may be explored to flesh out artifacts of the process used to determine non LCN exhausted link support. Referring to FIG. 4, once it is determined that there is no LCN exhaustion, an inquiry 402 is made into whether or not bandwidth exhaustion arises on the link in light of the requesting connection. FIG. 5a shows a methodology that may be used to determine whether or not bandwidth exhaustion exists for non LCN exhaustion situations.

Referring to the methodology of FIG. 5a and the link characteristics expressed in FIG. 7, assume that a first exemplary requesting connection is for a CBR connection of 622 Mb/s. In this case, the capacity of the requesting connection (622 Mb/s) exceeds the advertised maximum capacity of the link with oversubscription (adv't_max_cr_cbr=186 Mb/s). As an initial threshold, the bandwidth exhaustion check methodology 502 of FIG. 5a checks 510 for the condition described just above. With the sustained bandwidth capacity of a single connection exceeding the maximum capacity of the link with oversubscription, it is impossible for the link to entertain the connection 511.

Continuing to refer to the methodology of FIG. 5a and the link characteristics expressed in FIG. 7, assume that a second exemplary requesting connection is for a CBR connection of 25 Mb/s. In this case the bandwidth of the connection does not exceed the maximum capacity of the link (i.e., the answer to inquiry 510 is "no") nor does it exceed the available capacity advertised for CBR connections (adv't_avail_cr_cbr) of 36 Mb/s. As a consequence, bandwidth exhaustion does not exist and the answer inquiry to inquiry 512 is "no". Referring back to FIG. 4, if bandwidth exhaustion does not exist for a non LCN exhausted link, the link is deemed to be able to support the connection 407.

However, consider a third exemplary requesting CBR connection that requests 67 Mb/s of bandwidth. In this case, the bandwidth of the connection does not exceed the maximum capacity of the link (i.e., the answer to inquiry 510 is "no") but does exceed the available capacity advertised for CBR connections (adv't_avail_cr_cbr) of 36 Mb/s. In such a situation, bandwidth exhaustion is deemed to have arisen because the available bandwidth is exceeded for the service category type; but, depending on the priority of the requesting connection and the breakdown of reserved capacity as a function of priority $700_2$, there is a possibility that the bandwidth exhaustion condition can be cured through priority bumping.

FIG. 4 therefore shows that if bandwidth exhaustion is deemed to be applicable as to the requesting connection, a determination 404 is made as to whether or not over-subscription based priority bumping will cure the bandwidth exhaustion problem. FIG. 6a shows a methodology by which a new available bandwidth parameter (new_avail_cr) is calculated 601. The new available bandwidth parameter is aimed at "boosting" the available bandwidth above that advertised for the applicable service type (i.e., for the example presently being discussed, above the adv't_avail_cr_cbr=36 Mb/s value) by using the bandwidth already allocated to lower priority connections. As such, the priority of the requesting connection plays into the analysis. With the present example being for a CBR connection of 67 Mb/s, a pair of sub examples can be further evolved.

Specifically, consider a first sub example where the requesting CBR connection of 67 Mb/s is a priority 7 connection; and, consider a second sub example where the requesting CBR connection of 67 Mb/s is a priority 6 connection. In both sub examples the adv't_avail_cr value is the same and corresponds to the value being boosted (i.e., adv't_avail_cr_cbr=36 Mb/s). The summation term $$\sum^{\text{all\_lower priorities}} \frac{\text{rsrv'd\_bw}}{\text{ovrsbscrptn\_fctr\_X}} \qquad \text{EQN. 1}$$

observed in FIG. 6a corresponds to additional bandwidth above and beyond the adv't_avail_cr value that is gained through the bumping of lower priority calls. Importantly, the additional bandwidth is not limited to just the reserved bandwidth for the bumped calls, but also factors in the appropriate over-subscription for the requesting call as applied to the reserved bandwidth that is freed up by way of dropping the lower priority calls.

For example, for the priority 7 connection, the summation term above equates to (25 Mb/s)/0.83=30 Mb/s. Here, the only reserved bandwidth at a priority level lower than 7 is the 25 Mb/s reserved at priority level 8. Therefore the numerator of the summation term is 25 Mb/s. The over-subscription factor for a requesting CBR call is 0.83 as observed in breakdown $701_2$. Therefore the summation term for the priority 7 sub example is (25 Mb/s)/0.83=30 Mb/s. Adding the summation term of 30 Mb/s to the adv't_avail_cr value of 36 Mb/s as called for in FIG. 6a yields 66 Mb/s for the new_avail_cr value. Because the bandwidth of the requesting new connection (67 Mb/s) is greater than the bandwidth of new_avail_cr (91 Mb/s), the result of inquiry 602 ("no") flows to a determination that that over-subscription based priority bumping will not cure the bandwidth exhaustion problem (i.e., the "no" output of block 604). Referring back to FIG. 4, this means the requesting connection cannot be sustained on the link 408.

By contrast, referring to the second sub example in which the requesting connection is a 67 Mb/s priority 6 CBR connection, note that the summation term increases to (100 Mb/s)/0.83=120 Mb/s. In this case, for a requesting call of priority 6, there is 100 Mb/s of bandwidth reserved for lower priority connections (specifically, 75 Mb/s for priority 7 connections and 25 Mb/s for priority 8 connections). As such, the numerator of the summation terms is 100 Mb/s. As discussed above, the appropriate over-subscription factor for a requesting CBR connection is 0.83. Therefore the summation term for the second sub-example is (100 Mb/s)/0.83=120 Mb/s. Adding the summation term and the adv't_avail_cr_cbr term yields 156 Mb/s for the new_avail_cr value (i.e., 36 Mb/s+120 Mb/s=156 Mb/s).

In this case, unlike the previous sub example, the priority 7 connections are eligible for bumping; which, in turn, frees enough bandwidth to sustain the requesting connection. That is, because the bandwidth of the requesting new connection (67 Mb/s) is less than the bandwidth of new_avail_cr (156 Mb/s), the result of inquiry 602 ("yes") flows to a determination that over-subscription based priority bumping will cure the bandwidth exhaustion problem (i.e., the "yes" output of block 604). Referring back to FIG. 4, this means the requesting connection can be sustained on the link 407. Note also that, due to over-subscription effects, the requesting priority 6 CBR call could have requested as much as 156 Mb/s and still have been deemed sustainable.

2.2 LCN Exhaustion

Whereas FIG. 7 was devoted to examples relating to a link that is not in an LCN exhaustion state, FIG. 8, by contrast is devoted to a link that is within an LCN exhaustion state. Here, FIG. 8 can be viewed as referring to the same link that FIG. 7 referred to—albeit some time later after a large number of additional UBR connections have been established on the link (and along with those already established as described with respect to FIG. 7) so as to cause the LCN exhaustion state. Here, as will be made more apparent in more detail below, UBR connections cause some degree of difficulty because bandwidth is not formally reserved for them from the perspective a source node. The priority based breakdowns $800_2$, $800_3$ of FIG. 8, when compared to FIG. 7, demonstrate the effect.

Specifically, note that the bandwidth reservation status has not changed such that bandwidth reservation breakdown $700_2$ is identical to bandwidth reservation breakdown $800_2$; however, connection breakdown $700_3$ is vastly different than connection breakdown $800_3$. Specifically, new connections have clearly been added at least across the $2^{nd}$ through $4^{th}$ priority levels and the $10^{th}$ through $14^{th}$ priority levels (recognizing that new connections could also have been added across the $6^{th}$ through $8^{th}$ priority levels). Moreover, none of the new connections have caused any additional bandwidth to be reserved above and beyond that which was reserved in FIG. 7. Therefore, all of the new connections are of type in which the bandwidth consumed cannot be articulated with any specificity (e.g., UBR connections). Moreover, to re-iterate, the quantity of new connections was sufficiently high so as to cause LCN exhaustion.

As described above, according to one approach a link deemed to be in LCN exhaustion has both its broadcasted adv't_max_cr_X and adv't_avail_cr_X parameters 802, 803 set equal to zero. By so doing, a source node can recognize that the link is within an LCN exhaustion state. Nevertheless, the present discussion is directed to bumping connections based on priority; and, as a consequence, even though LCN exhaustion exists, the possibility of introducing a new connection can still be entertained. In particular, if a pre-existing connection having a lower priority than the proposed new connection exists; then, it is conceivable that the new connection can be added at the expense of dropping the lower priority connection. Here, referring back to FIG. 4 note that all LCN exhaustion situations in which the new connection is deemed sustainable 407 are conditional on there being a lower priority connection than the proposed new connection 406.

An additional problem arises when trying to introduce new connections if a link deemed to be in LCN exhaustion has both its broadcasted adv't_max_cr and adv't_avail_cr_X parameters 802, 803 set equal to zero. As a consequence, the adv't_max_cr and adv't_avail_cr_X parameters 802, 803 cannot be used to evaluate the bandwidth reservation implications of a proposed new connection. Therefore, an aspect of the present teachings is that the following information should be added to the broadcast messages that the describe the link (in addition to the adv't_max_cr and adv't_avail_cr_X parameters 802, 803 set equal to zero, and the priority based breakdowns 800): 1) the actual maximum cell or bit rate of the link $801_3$ for each service category (e.g., actual_max_cr_X); 2) the actual available cell or bit rate of the link for each service category type $801_4$ (e.g., actual_avail_cr_X); and, 3) (like the non LCN exhaustion case) the over-subscription factor for each service category type $801_2$.

Here, the actual_max_cr_X $801_3$ and actual_avail_cr_X $801_4$ parameters respectively provide the information that would have been provided by the adv't_max_cr_X and adv't_avail_cr_X parameters 802, 803 had these parameters 802, 803 not been set equal to zero to indicate LCN exhaustion. That is, the actual_max_cr_X values together specify the maximum bandwidth capacity of the link for each service category (e.g., 183 Mb/s for CBR in the present example); and, the actual_avail_cr_X values together specify the available capacity of the link as a function of each service category type.

Referring then to FIG. 4, note that once LCN exhaustion is detected 401, an inquiry is made into whether or not bandwidth exhaustion exists 403. FIG. 5b shows an embodiment of a methodology suitable for determining the presence of bandwidth exhaustion for a link in the LCN exhaustion state. Comparing the methodologies of FIGS. 5a and 5b, note that the structure and flow of the non LCN exhaustion and LCN exhaustion methodologies may be the same—save for, whereas the non LCN exhaustion flow (FIG. 5a) uses the adv't_max_cr_X and adv't_avail_cr_X parameters, the LCN exhaustion flow (FIG. 5b) uses the actual_max_cr_X and actual_avail_cr_X parameters. Therefore examples for the LCN exhaustion case may largely reiterate examples discussed for the non LCN exhaustion case.

Referring to the methodology of FIG. 5b and the link characteristics expressed in FIG. 8, assume that a first exemplary requesting connection is for a CBR connection of 622 Mb/s. In this case, the capacity of the requesting link (622 Mb/s) exceeds the maximum capacity of the link (actual_max_cr_cbr=183 Mb/s). As an initial threshold, the bandwidth exhaustion check methodology 503 of FIG. 5a checks 513 for the condition described just above. With the sustained bandwidth capacity of a single connection exceeding the maximum capacity of the link for its corresponding service type, it is impossible for the link to entertain the connection 514.

Continuing to refer to the methodology of FIG. 5b and the link characteristics expressed in FIG. 8, assume that a second exemplary requesting connection is for a CBR connection of 25 Mb/s. In this case the bandwidth of the connection does not exceed the maximum capacity of the link (i.e., the answer to inquiry 513 is "no") nor does it exceed the available capacity advertised for CBR connections (actual_avail_cr_cbr) of 36 Mb/s. As a consequence, bandwidth exhaustion does not exist and the answer to inquiry 515 is "no".

Referring back to FIG. 4, if bandwidth exhaustion does not exist for an LCN exhausted link, a conditional inquiry is made 406 to see if a lower priority connection is in existence. If a lower priority connection is in existence, a lower priority connection can be dropped to make room for the new connection and the link is deemed to be able to sustain the new connection 407. If a lower priority connection is not in existence, the link is deemed to be unable to sustain the new connection 408. Thus, referring to the connection established breakdown $800_3$ of FIG. 8, the proposed new connection will only be refused if it is a priority 14, or 16 connection (i.e., from breakdown $800_3$, only priorities 14, 15 and 16 do not have a lower priority connection in existence).

Now consider a third exemplary requesting CBR connection that requests 67 Mb/s of bandwidth. In this case, the bandwidth of the connection does not exceed the maximum capacity of the link (i.e., the answer to inquiry 513 is "no") but does exceed the available capacity advertised for CBR connections (actual_avail_cr_cbr) of 36 Mb/s. In such a situation, bandwidth exhaustion is deemed to have arisen because the available bandwidth is exceeded for the service category type; but, depending on the priority of the requesting connection and the breakdown of reserved capacity as a function of priority $800_2$, there is a possibility that the bandwidth exhaustion condition can be cured through priority bumping.

FIG. 4 therefore shows that if bandwidth exhaustion is deemed to be applicable as to the requesting connection, a determination 405 is made as to whether or not over-subscription based priority bumping will cure the bandwidth exhaustion problem. FIG. 6b shows a methodology by which a new available bandwidth parameter (new_avail_cr) is calculated 603 for LCN exhaustion cases. The new available bandwidth parameter has the same purpose as that discussed with respect to FIG. 6a. That is, the new available bandwidth parameter is aimed at "boosting" the available bandwidth above that advertised for the requesting connection (i.e., for the example presently being discussed, above the actual_avail_cr_cbr=36 Mb/s value) by using the bandwidth already allocated to lower priority connections. As such, the priority of the requesting connection plays into the analysis. With the present example being for a CBR connection of 67 Mb/s, a pair of sub examples can be further evolved.

Specifically, consider a first sub example where the requesting CBR connection of 67 Mb/s is a priority 7 connection; and, consider a second sub example where the requesting CBR connection of 67 Mb/s is a priority 6 connection. In both sub examples the actual_avail_cr value is the same and corresponds to the value being boosted (i.e., actual_avail_cr_cbr=36 Mb/s). Note that the same summation term as expressed in EQN. 1 and as appears in FIG. 6a is used in the methodology of FIG. 6b. Recall that the summation term corresponds to additional bandwidth above and beyond the actual_avail_cr value that is gained through the bumping of lower priority calls. Importantly, the additional bandwidth is not limited to just the reserved bandwidth for the bumped calls, but also factors in the appropriate over-subscription for the requesting call as applied to the reserved bandwidth that is freed up by way of dropping the lower priority calls.

For example, for the priority 7 connection, the summation term equates to (25 Mb/s)/0.83=30 Mb/s. Here, the only reserved bandwidth at a priority level lower than 7 is the 25 Mb/s reserved at priority level 8 (i.e., X in breakdown $800_2$ is to be interpreted as being equal to 0). Therefore the numerator of the summation term is 25 Mb/s. The over-subscription factor for a requesting CBR call is 0.83 as observed in breakdown $801_2$. Therefore the summation term for the priority 7 sub example is (25 Mb/s)/0.83=30 Mb/s. Adding the summation term of 30 Mb/s to the actual_avail_cr value of 36 Mb/s as called for in FIG. 6b yields 66 Mb/s for the new_avail_cr value. Because the bandwidth of the requesting new connection (67 Mb/s) is greater than the bandwidth of new_avail_cr (66 Mb/s), the result of inquiry 605 ("no") flows to a determination that that over-subscription based priority bumping will not cure the bandwidth exhaustion problem (i.e., the "no" output of block 605). Referring back to FIG. 4, this means the requesting connection cannot be sustained on the link 408.

By contrast, referring to the second sub example in which the requesting connection is a 67 Mb/s priority 6 CBR connection, note that the summation term increases to (100 Mb/s)/0.83=120 Mb/s. In this case, for a requesting call of priority 6, there is 100 Mb/s of bandwidth reserved for lower priority connections (specifically, 75 Mb/s for priority 7 connections and 25 Mb/s for priority 8 connections). As such, the numerator of the summation terms is 100 Mb/s. As discussed above, the appropriate over-subscription factor for a requesting CBR connection is 0.83. Therefore the summation term for the second sub-example is (100 Mb/s)/0.83=120 Mb/s. Adding the summation term and the actual_avail_cr_cbr term yields 156 Mb/s for the new_avail_cr value (i.e., 36 Mb/s+ 120 Mb/s=181 Mb/s).

In this case, unlike the previous sub example, the priority 7 connections are eligible for bumping; which, in turn, frees enough bandwidth to sustain the requesting connection. That is, because the bandwidth of the requesting new connection (67 Mb/s) is less than the bandwidth of new_avail_cr (156 Mb/s), the result of inquiry 604 ("yes") flows to a determination that over-subscription based priority bumping will cure the bandwidth exhaustion problem (i.e., the "yes" output of block 605). Referring back to FIG. 4, this means the requesting connection can be sustained on the link 407 provided a lower priority connection exists 406. Given that lower priority connections are used as a basis for freeing up the bandwidth given to the new connection, the answer to inquiry 406 should always be "yes" (i.e., the connection should always be deemed sustainable if lower priority connections are to be dropped to make room for the new call). Note also that, due to over-subscription effects, the requesting priority 6 CBR call could have requested as much as 156 Mb/s and still have been deemed sustainable. Note also that UBR connections need not invoke inquiry 403 because UBR connections do not reserve bandwidth.

3.0 PTSP, PTSE and SIG

Once a source node has determined a workable and appropriate route for a new connection, in various embodiments, it issues a SETUP message that traverses the network to the destination endpoint node. In an embodiment, for those connections having some degree of bandwidth specificity, the SETUP message is constructed so as to include the priority level and bandwidth of the connection being established so that the nodes that carry the new connection and that have to drop one or more connections can determine how many connections are to be dropped. In a typical embodiment, when dropping one or more calls is appropriate, the nodes are designed to drop connections in reverse priority order (i.e., the lowest priority connection is always the next connection to be dropped) until sufficient bandwidth is freed taking into account the over-subscription.

Recall from FIG. 2 and Section 1.0 of this detailed description that a prospective source node will receive 201 System capabilities Information Group (SIG) information (from the other nodes within the PNNI network in which it resides) that includes the per priority and per service category breakdown information. SIG information is a mechanism that has been established by the PNNI scheme for the passing of information that has not been formally provided for by the PNNI standard.

Here, SIG information is broadcast by each node in the network so that a prospective source endpoint node can receive the SIG information and develop an understanding of the status of the links within the network as described herein. As part of the PNNI scheme, each node within the network is typically designed to "broadcast" other information (i.e., other than SIG information) that pertains to its understanding of itself and/or the network in which it resides. These broadcasts may occur at specific time intervals and/or upon the occurrence of certain special events.

Figure 1:
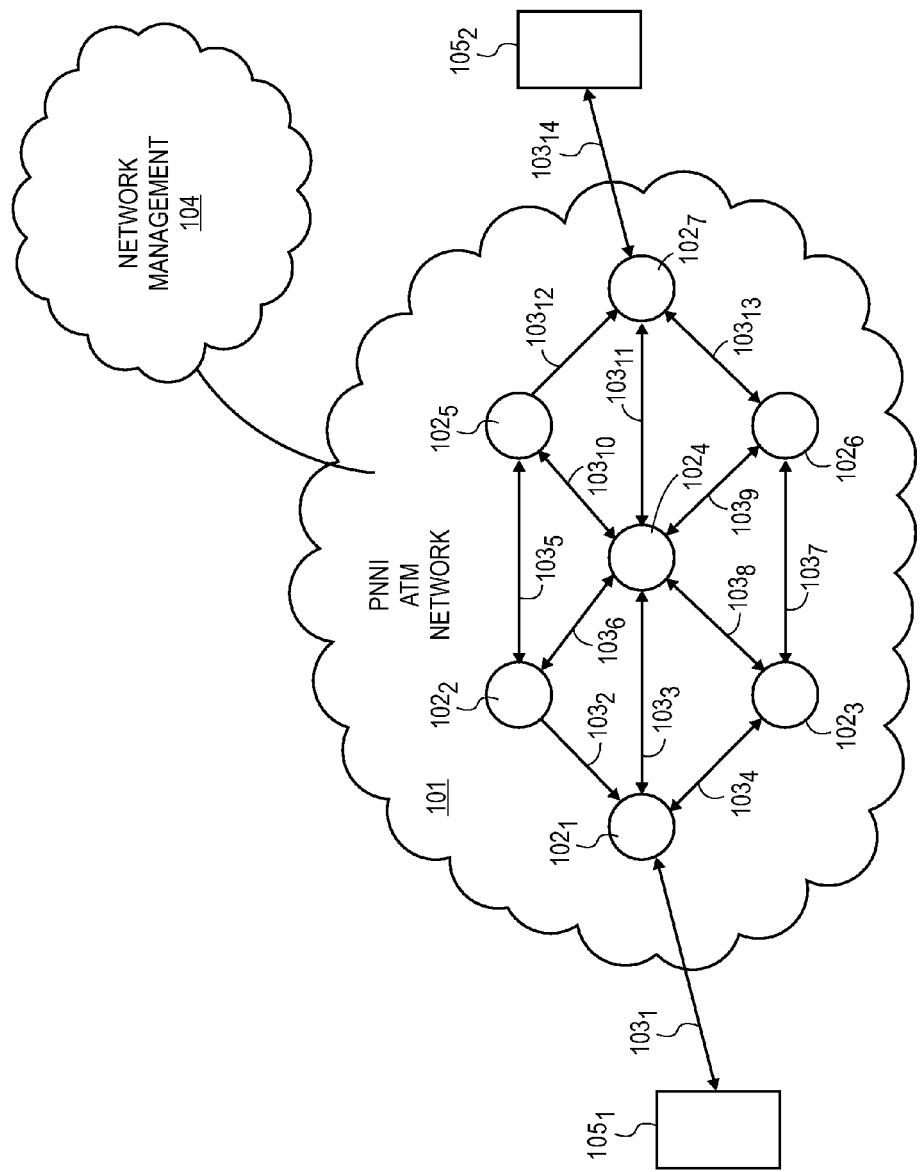

For example, referring to FIG. 1, if a node $102_5$ observes that networking link $103_{10}$ is not working, the node $102_5$ will broadcast this event to its neighboring nodes $102_2$, $102_7$. Upon the reception of this information, the neighboring nodes $102_2$, $102_7$ will "update" their internal understandings of the network (to reflect this event) as well as rebroadcast this event to their neighboring nodes so that they may update their internal understandings as well. The information is continually rebroadcast as appropriate so that the affected nodes can update their understandings of the network and behave accordingly.

Thus, in a sense, the occurrence of the event ripples through the network so that its constituent nodes can cohesively route information around the downed link $103_{10}$ in response. In other cases, typically, the network's nodes $102_1$ through $102_7$ are also configured to periodically broadcast current status information as well as special events. Thus, on a broader scale, the nodes of the network may be said to communicate procedural (e.g., "control") information with one another as well as the substantive information associated with user traffic.

This control information is often organized into one or more PNNI Topology State Elements (hereinafter, referred to as PTSEs) that are embedded into a PNNI Topology State Packet (hereinafter, referred to as a PTSP). A PTSP is a packet that acts as the broadcast mechanism while a PTSE acts as a component of the PTSP's payload. Thus, for example, if a node has information to broadcast it issues a PTSP that carries one or more PTSEs that each have the information to be communicated. An embodiment 900 of a PTSP is shown in FIG. 9 and an embodiment 1001 of a PTSE is shown in FIG. 10.

Referring to FIG. 9, a PTSP may be viewed as having a header field 906 and a PTSE field 901. The header field 902 has various header information (e.g., checksum info, lifetime, etc.) as well as the identification of the node that is issuing the PTSP (which is located within the originating node ID field 903), the peer group within which the originating node resides (which is located within the Peer Group ID field 904).

The PTSE field 901 includes one or more PTSEs $901_1$ through $901_x$. An embodiment 1001 of a PTSE is shown in FIG. 10. That is, for example, the PTSE embodiment 1001 of FIG. 10 may be viewed as corresponding to the PTSE $901_1$ of FIG. 9. Referring to FIG. 10, note that a PTSE may also be viewed as having a header field 1002 and a payload field 1003. The header field 1002 includes various header information such as a type field 1006 that identifies the data structure 1001 as a PTSE, a length field 1007 that identifies the length of the PTSE, a reserved field 1009 for potential future uses and a checksum field 1012.

The PTSE header field 1002 also includes an identifier field 1010 that identifies the type of PSTE that PTSE 1001 corresponds to. That is, PNNI employs a characterization scheme so that specific types of information can be binned together or recognized within a common PTSE format. The various PTSE types include (among possible others): 1) Horizontal Link; 2) Uplink; 3) External Address; 4) Internal Address; 5) Nodal Parameters (complex node); and 6) Nodal. Those of ordinary skill can identify the purpose and/or use of each PTSE type.

Referring to the PTSE embodiment 1001 of FIG. 10, note that the payload field 1003 may be viewed as being partitioned into an "industry standard" field 1004 and the aforementioned System Capabilities Information Group (SIG) field 1005. The industry standard field 1004 is used to carry specific information according to a specific format that has been articulated by the PNNI standard. The SIG field 1005, by contrast, is used for developers of PNNI compliant networking gear that seek to include special features beyond those recognized or articulated by the PNNI standard.

Through the use of the SIG field 1005, two nodes from the same manufacturer can communicate information with one other that is not specifically provided for by the PNNI standard; while, at the same time, operate in compliance with the PNNI standard. That is, those nodes that can understand and use the contents of the SIG field 1005 may do so while those that do not understand the SIG field 1005 contents may simply ignore its information (as well as forward the PTSE having the SIG field to another node via a rebroadcast effort).

The Horizontal Link PTSE type is commonly used to transport information that pertains to a link, or a portion of a link. That is, finer granularities that the whole of a link's resources may be specified or described with a Horizontal Link PTSE. These finer granularities may be used to develop a deeper understanding of the network's links. For example, the industry standard field 1004 of a Horizontal Link PTSE can specify a particular type of service such as a Constant Bit Rate (CBR) service, a real time or non-real time Variable Bit Rate (VBR) service, an Available Bit Rate (ABR) service and an Unspecified Bit Rate (UBR) service. Further still, the industry standard field 1004 of a Horizontal Link PTSE can specify particular QoS parameters (e.g., average cell rate, max cell rate, cell transfer delay, cell delay variation, and cell loss ratio).

FIG. 11 shows an embodiment 1105 of a SIG field. That is, the SIG field 1105 of FIG. 11 may be viewed as an embodiment of the SIG field 1005 of FIG. 10. The SIG field embodiment 1105 of FIG. 11 can also be viewed as having a header field component 801 and a payload field component 1102. The header field component 1101 includes various header information such as a type field 1106 (that indicates the data structure 1105 is a SIG field), a length field 1107 that describes its length and an Organization Unique Identifier (OUI) field 1108 that is typically used to recognize the manufacturer of the node that issued the SIG information (i.e., is a "vendor-specific" label). As a SIG field is typically used by the nodes of a common manufacturer to support functional improvements (beyond the PNNI standard) that are unique to the products of the manufacturer, the OUI field 1108 is often used by a node to decide whether or not to ignore a received SIG field. That is, if the vendor specific label of the OUI field 1108 "matches" the vendor of the node that receives the SIG information, the SIG information will be "looked into"; otherwise, the SIG information will be discarded.

Within the payload 1102 of the SIG field 1105, the ID # field 1103 identifies the particular type of information being delivered by the SIG 1105. This allows a node that supports vendor-specific functionality to understand the specific type of information enclosed in the payload 1102. As such, in an embodiment, a specific binary number is used to identify that the SIG field 1105 includes any or all information related to the breakdowns 300, 301 first introduced in FIG. 3 that are specified in the industry standard portion of the PTSE that carries the SIG field 1105.

In the particular embodiment of FIG. 11, the bandwidth allocations made to each priority level (e.g., as depicted in breakdown $300_2$ of FIG. 3) are specified field 1104, the indications as to whether or not a connection exists for each priority level (e.g., as depicted in breakdown $300_3$ of FIG. 3) are specified in field 1105, the per service category breakdown of over-subscription factor (e.g., as depicted in field $301_2$ of FIG. 3) are specified in field 1109, the actual maximum link capacity for each service category (e.g., actual_max_cr_X as depicted in field $301_3$ of FIG. 3) is specified in field 1110, and the per service category breakdown of actually available bandwidth (e.g., as depicted in field $301_4$ of FIG. 3) is specified in field 1111. Note that, at the designer's option, fields 1105, 1110 and 1111 may only be included for links deemed to be in LCN exhaustion. Here, a separate ID# could 1103 could be used for non LCN exhausted and LCN exhausted links.

The rate at which PTSE information (having priority based and service category breakdowns as provided in FIG. 3 within its SIG field) is broadcast from a particular node may vary from embodiment to embodiment. For example, in one embodiment, PTSE information may be broadcast for each new connection. In various networking environments, however, issuing new PTSE information from each node that undergoes a mere change may congest the network with PTSP packets; or, may make an already congested network even further congested. As such, periodic broadcasts may be employed.

To the extent that the understandings of the network that are being maintained by the endpoint nodes become inaccurate, the "crankback" mechanism associated with PNNI signaling may be employed to recover from such an inaccuracy. Specifically, an inaccurate network understanding may result in the release of a SETUP message from a source endpoint node for a connection path that cannot be entertained because higher priority connections have already been established between the time the source endpoint node's latest PTSE information was issued and the time the connection request was received.

Upon the receipt of such a SETUP message by a node that is intended to carry the new connection yet cannot support it (because its bandwidth resources are already consumed by higher or equal priority level connections), the node may return a "crankback" message back to the source endpoint node that issued the SETUP message. The crankback message can be constructed so as to contain information that effectively explains the problem to the source endpoint node. In response, the source endpoint node can update its network understanding and re-determine another path through the network.

As routing and signaling protocols are often implemented with software, it is to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; etc.

Furthermore, it is noteworthy to point out that a network node (which may also be referred to as a networking node, a node, a networking system and the like) is a system designed to act as a switch or a router or other device that relays information from a first networking line to a second networking line. A depiction of a networking node 1200 is observed in FIG. 12. A plurality of networking lines $1201_1$ through $901_6$ (e.g., copper cables or fiber optic cables) are shown in FIG. 12 as being coupled to the networking node 1200.

The node 1200 is mostly responsible for collecting a traffic unit (e.g., a packet, a cell or a Time Division Multiplexed (TDM) time slot) from a first networking line (e.g., networking line $1201_1$) and re-transmitting at least a portion of it (e.g., its payload and various sections of its header) onto a second networking line (e.g., networking line $1201_6$). As such, the node 1200 effectively relays information so that it may be carried over various geographic distances. Some degree of intelligence is involved in the relaying process so that the traffic units being collected are forwarded onto an appropriate networking line (e.g., in light of their source address and destination address).

As such, the node 1200 of FIG. 12 shows an traffic ingress/egress layer 1202 and a switching/routing layer 1203. The ingress/egress layer 1202 is responsible for collecting inbound traffic units from the networking lines upon which they arrived; and, presenting at least a portion of them (e.g., their header information) to the switching/routing layer 1203. The ingress/egress layer 1202 is also responsible for transmitting outgoing traffic units onto a networking line in response to the direction or control of the switching/routing layer 1203.

The switching/routing layer 1203 is responsible for effectively deciding which networking line is an appropriate networking line upon which a particular traffic unit should be transmitted upon. The switching/routing layer 1203 often performs this activity based upon header information or other control information (such as SS7 based TDM connection information) associated with each traffic unit. Connection establishment and tear-down procedures (as well as network topology broadcasts or other networking overhead information) can often be viewed as being integrated into (or coupled to so as to communicate with) the switching/routing layer 1203.

Note that the architecture of a networking system having a routing/switching layer 1203 and an ingress/egress layer 1202 may vary from embodiment to embodiment. For example, in some cases the switching/routing layer 1203 may be designed onto a single card; or, in other cases, the switching/routing layer 1203 may be designed across a plurality of cards. Also, in some cases the switching/routing layer 1203 (or a portion thereof) may be integrated onto a Line Interface Card (LIC) that also acts as part of the ingress/egress layer 1202.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for reporting links that are in a logical channel (LCN) exhaustion state where a maximum permissible number of connections has been reached, the method comprising:
   observing by a node in a Private Network Node Interface (PNNI) Asynchronous Transfer Mode (ATM) network that a link is in the LCN exhaustion state;
   issuing a PNNI Topology State Packet (PTSP) from the node for the link that is in the LCN exhaustion state, the PTSP including a PNNI Topology State Element (PTSE) having information about the link, said PTSE information further comprising:
   a) a per priority level breakdown of bandwidth reserved on said link and whether or not a connection exists on said link for each priority level;
   b) a per service category breakdown of over-subscription factors, or, information from which a per service category breakdown of over-subscription factors can be determined, actual available capacity on said link for each of said service categories, and an advertised available capacity value set equal to zero for each of said service categories; and
   c) an indication of the actual maximum capacity of said link and an advertised maximum capacity value set equal to zero.

2. The method of claim 1 wherein said PTSE information is a Horizontal Link PTSE information type.

3. The method of claim 1 wherein said PTSE information further comprises System Capabilities Information Group (SIG) information containing:
   said per priority level breakdown of bandwidth reserved on said link
   and
   said per service category breakdown of over-subscription factors, or, said information from which a per service category breakdown of over-subscription factors can be determined.

4. The method of claim 1 wherein one of said service categories is a continuous bit rate (CBR) service.

5. The method of claim 1 wherein one of said service categories is a variable bit rate (VBR) service.

6. The method of claim 1 wherein one of said service categories is an available bit rate (ABR) service.

7. A method for deciding if a network link is able to sustain a new connection, said method comprising:
   receiving a PNNI Topology State Packet (PTSP) from a node in a Private Network Node Interface (PNNI) Asynchronous Transfer Mode (ATM) network, the PTSP including a PNNI Topology State Element (PTSE) having information about said network link;
   determining if said link is within a logical channel (LCN) exhaustion state from said information in said PTSE;
   determining if said new connection requests more bandwidth than is advertised as being available upon said link for said new connection's service category;
   if said link is not within said LCN exhaustion state and said new connection requests more bandwidth than is advertised as being available upon said link for said new connection's service category, regarding the bandwidth available for said new connection as a sum, said sum comprising addition of:
   1) said advertised available bandwidth and
   2) the total bandwidth reserved on said link for connections having lower priority than said new connection enhanced by over-subscription for said service category.

8. The method of claim 7 further comprising deciding that said link is not able to sustain said new connection because said bandwidth requested by said new connection exceeds said sum.

9. The method of claim 7 further comprising deciding that said link is able to sustain said new connection because said sum exceeds said bandwidth requested by said new connection.

10. The method of claim 7 further comprising deciding that said link is not able to sustain a second new connection because said second new connection requests more bandwidth than an advertised maximum bandwidth of said link.

11. The method of claim 7 further comprising:
    if said link is within said LCN exhaustion state and a second new connection requests more bandwidth than is indicated via System Capabilities Information Group (SIG) information as being available upon said link for said second new connection's service category, regarding the bandwidth available for said second new connection as a sum, said sum comprising addition of:
    1) said bandwidth indicated via SIG information and
    2) the total bandwidth reserved on said link for connections having lower priority than said second new connection enhanced by over-subscription for said second connection's service category.

12. The method of claim 7 further comprising detecting said LCN exhaustion state by recognizing that:
    1) said advertised available bandwidth has been set equal to zero; and,
    2) an advertised maximum bandwidth of said link has been set equal to zero.

13. The method of claim 11 further comprising deciding that said link is not able to sustain said second new connection because said bandwidth requested by said second new connection exceeds said sum.

14. The method of claim 11 further comprising deciding that said link is able to sustain said second new connection because said sum exceeds said bandwidth requested by said second new connection and because there exists a pre-established connection on said link having a lower priority than said second new connection, said pre-established connection being indicated via SIG information describing a per priority level breakdown of whether or not a pre-established connection exists on said link.

15. The method of claim 11 further comprising deciding that said link is not able to sustain said second new connection even though said sum exceeds said bandwidth requested by said second new connection because there does not exist a pre-established connection on said link having a lower priority than said second new connection, said lack of a pre-established connection being indicated via SIG information describing a per priority level breakdown of whether or not a pre-established connection exists on said link.

16. A method for deciding if a link in a Private Network Node Interface (PNNI) Asynchronous Transfer Mode (ATM) network is able to sustain a new connection, said method comprising:
    receiving a PNNI Topology State Packet (PTSP) for said link, the PTSP including a PNNI Topology State Element (PTSE) having information about said link, said PTSE information having System Capabilities Information Group (SIG) information that comprises:
    a per priority level breakdown of bandwidth reserved on said link;
    a per service category breakdown of over-subscription factors;
    storing said PTSE information about said link; and deciding whether said link is able to sustain a new connection if said new connection's bandwidth exceeds an available bandwidth for said new connection found within said PTSE information for said link by adding a total bandwidth reserved on said link for connections having lower priority than said new connection enhanced by said over-subscription factor for said service category to said available bandwidth.

17. The method of claim 16 wherein said available bandwidth is:
1) received according to a technique specified by a PNNI standard if said link is not in a logical channel (LCN) exhaustion state; or,
2) received as part of said SIG information if said link is within an LCN exhaustion state.

18. The method of claim 16 further comprising deciding that said link is not able to sustain said new connection because said bandwidth requested by said new connection exceeds said sum.

19. The method of claim 16 further comprising deciding that said link is able to sustain said new connection because said sum exceeds said bandwidth requested by said new connection.

20. The method of claim 16 further comprising deciding that said link is able to sustain said new connection because said sum exceeds said bandwidth requested by said new connection and because there exists a pre-established connection on said link having a lower priority than said new connection, said pre-established connection being indicated via SIG information describing a per priority level breakdown of whether or not a pre-established connection exists on said link, said link in an LCN exhaustion state.

21. The method of claim 16 further comprising deciding that said link is not able to sustain said new connection even though said sum exceeds said bandwidth requested by said new connection because there does not exist a pre-established connection on said link having a lower priority than said new connection, said lack of a pre-established connection being indicated via SIG information describing a per priority level breakdown of whether or not a pre-established connection exists on said link, said link in an LCN exhaustion state.

22. A machine readable medium having stored thereon a sequence of instructions which when executed by a processor cause said processor to perform a method for reporting links that are in a logical channel (LCN) exhaustion state where a maximum permissible number of connections has been reached, said method comprising:
observing that a link within an Asynchronous Transfer Mode (ATM) Private Network Node Interface (PNNI) network is in the LCN exhaustion state; and,
issuing a PNNI Topology State Packet (PTSP) for the link that is in the LCN exhaustion state, the PTSP including a PNNI Topology State Element (PTSE) having information about the link, said PTSE information further comprising:
a) a per priority level breakdown of bandwidth reserved on said link and whether or not a connection exists on said link for each priority level;
b) a per service category breakdown of over-subscription factors, or, information from which a per service category breakdown of over-subscription factors can be determined, actual available capacity on said link for each of said service categories, and an advertised available capacity value set equal to zero for each of said service categories; and
c) an indication of the actual maximum capacity of said link and an advertised maximum capacity value set equal to zero.

23. The machine readable medium of claim 22 wherein said PTSE information is a Horizontal Link PTSE information type.

24. The machine readable medium of claim 22 wherein said PTSE information further comprises System Capabilities Information Group (SIG) information containing:
said per priority level breakdown of bandwidth reserved on said link and
said per service category breakdown of over-subscription factors, or, said information from which a per service category breakdown of over-subscription factors can be determined.

25. The machine readable medium of claim 22 wherein one of said service categories is a continuous bit rate (CBR) service.

26. The machine readable medium of claim 22 wherein one of said service categories is a variable bit rate (VBR) service.

27. The machine readable medium of claim 22 wherein one of said service categories is an available bit rate (ABR) service.

28. A machine readable medium having a sequence of instructions which when executed cause a processor to perform a method to assist in for deciding if a network link is able to sustain a new connection, said method comprising:
receiving a PNNI Topology State Packet (PTSP) from a node in a Private Network Node Interface (PNNI) Asynchronous Transfer Mode (ATM) network, the PTSP including a PNNI Topology State Element (PTSE) having information about said network link;
determining if said link is within a logical channel (LCN) exhaustion state from said information in said PTSE;
determining if said new connection requests more bandwidth than is advertised as being available upon said link for said new connection's service category;
if said link is not within said LCN exhaustion state and said new connection requests more bandwidth than is advertised as being available upon said link for said new connection's service category, regarding the bandwidth available for said new connection as a sum, said sum comprising addition of:
1) said advertised available bandwidth and
2) the total bandwidth reserved on said link for connections having lower priority than said new connection enhanced by over-subscription for said service category.

29. The machine readable medium of claim 28 wherein said method further comprises deciding that said link is not able to sustain said new connection because said bandwidth requested by said new connection exceeds said sum.

30. The machine readable medium of claim 28 wherein said method further comprises deciding that said link is able to sustain said new connection because said sum exceeds said bandwidth requested by said new connection.

31. The machine readable medium of claim 28 wherein said method further comprises deciding that said link is not able to sustain a second new connection because said second new connection requests more bandwidth than an advertised maximum bandwidth of said link.

32. The machine readable medium of claim 28 wherein said method further comprises:
if said link is within said LCN exhaustion state and a second new connection requests more bandwidth than is indicated via System Capabilities Information Group (SIG) information as being available upon said link for said second new connection's service category, regarding the bandwidth available for said second new connection as a sum, said sum comprising addition of:
1) said bandwidth indicated via SIG information and
2) the total bandwidth reserved on said link for connections having lower priority than said second new connection enhanced by over-subscription for said second connection's service category.

33. The machine readable medium of claim 28 wherein said method further comprises detecting said LCN exhaustion state by recognizing that:
1) said advertised available bandwidth has been set equal to zero; and,
2) an advertised maximum bandwidth of said link has been set equal to zero.

34. The machine readable medium of claim 32 wherein said method further comprises deciding that said link is not able to sustain said second new connection because said bandwidth requested by said second new connection exceeds said sum.

35. The machine readable medium of claim 32 wherein said method further comprises deciding that said link is able to sustain said second new connection because said sum exceeds said bandwidth requested by said second new connection and because there exists a pre-established connection on said link having a lower priority than said second new connection, said pre-established connection being indicated via SIG information describing a per priority level breakdown of whether or not a pre-established connection exists on said link.

36. The machine readable medium of claim 32 wherein said method further comprises deciding that said link is not able to sustain said second new connection even though said sum exceeds said bandwidth requested by said second new connection because there does not exist a pre-established connection on said link having a lower priority than said second new connection, said lack of a pre-established connection being indicated via SIG information describing a per priority level breakdown of whether or not a pre-established connection exists on said link.

37. A machine readable medium having a sequence of instructions which when executed by a processor cause said processor to perform a method for deciding if a link in a Private Network Node Interface (PNNI) Asynchronous Transfer Mode (ATM) network is able to sustain a new connection, said method comprising:
receiving a PNNI Topology State Packet (PTSP) for said link, the PTSP including a PNNI Topology State Element (PTSE) having information about said link, said PTSE information having System Capabilities Information Group (SIG) information that comprises:
a per priority level breakdown of bandwidth reserved on said link;
a per service category breakdown of over-subscription factors; and,
deciding whether said link is able to sustain a new connection if said new connection's bandwidth exceeds an available bandwidth for said new connection found within said PTSE information for said link by adding a total bandwidth reserved on said link for connections having lower priority than said new connection enhanced by said over-subscription factor for said service category to said available bandwidth.

38. The machine readable medium of claim 37 wherein said available bandwidth is:
1) received according to a technique specified by a PNNI standard if said link is not in a logical channel (LCN) exhaustion state; or,
2) received as part of said SIG information if said link is within an LCN exhaustion state.

39. The machine readable medium of claim 37 wherein said method further comprises deciding that said link is not able to sustain said new connection because said bandwidth requested by said new connection exceeds said sum.

40. The machine readable medium of claim 37 wherein said method further comprises deciding that said link is able to sustain said new connection because said sum exceeds said bandwidth requested by said new connection.

41. The machine readable medium of claim 37 wherein said method further comprises deciding that said link is able to sustain said new connection because said sum exceeds said bandwidth requested by said new connection and because there exists a pre-established connection on said link having a lower priority than said new connection, said pre-established connection being indicated via SIG information describing a per priority level breakdown of whether or not a pre-established connection exists on said link, said link in an LCN exhaustion state.

42. The machine readable medium of claim 37 wherein said method further comprises deciding that said link is not able to sustain said new connection even though said sum exceeds said bandwidth requested by said new connection because there does not exist a pre-established connection on said link having a lower priority than said new connection, said lack of a pre-established connection being indicated via SIG information describing a per priority level breakdown of whether or not a pre-established connection exists on said link, said link in an LCN exhaustion state.

* * * * *